Jan. 10, 1950 R. C. DEHMEL 2,494,508
MEANS FOR AIRCRAFT FLIGHT TRAINING
Filed June 18, 1941 10 Sheets-Sheet 4
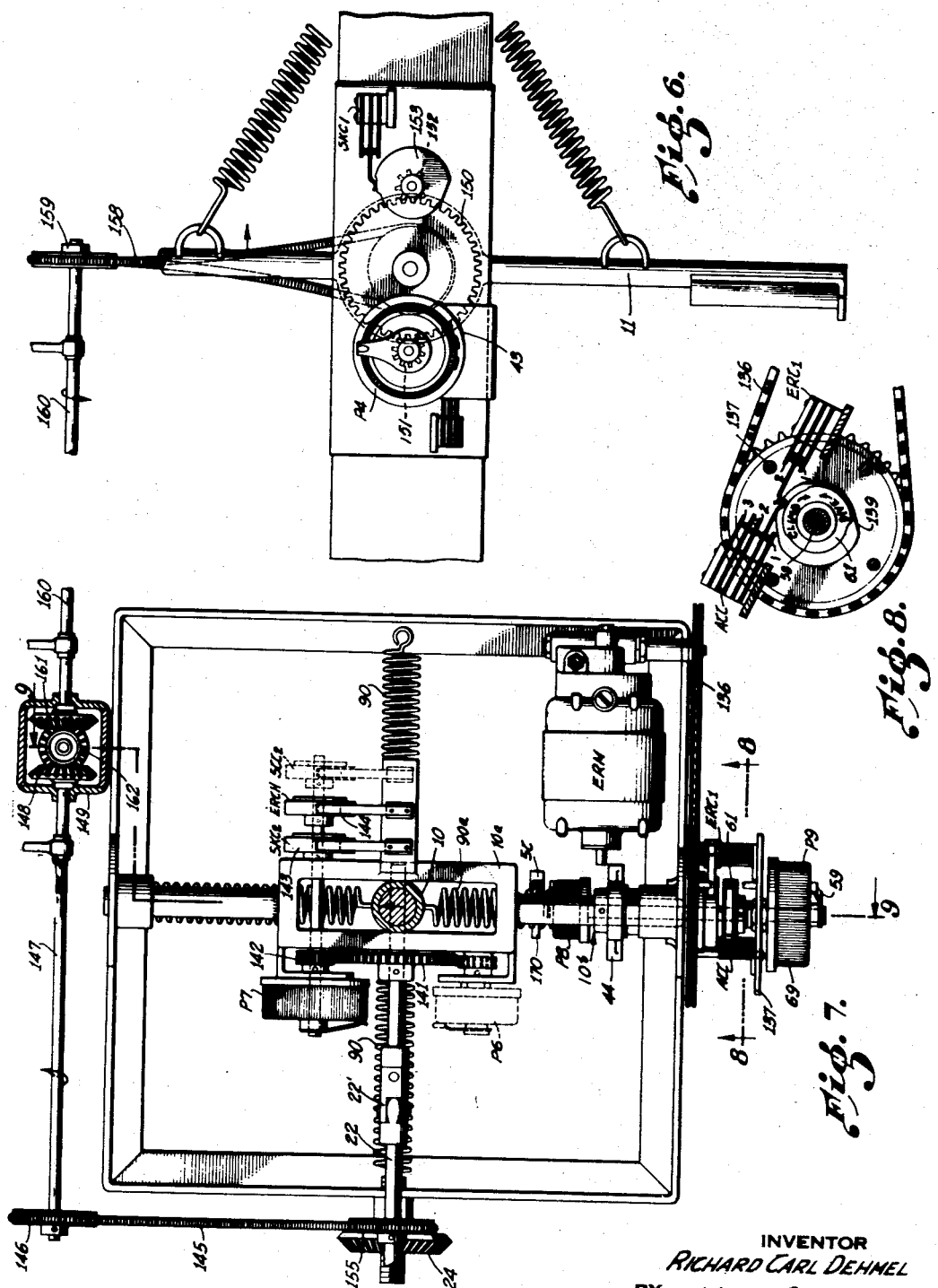
INVENTOR
RICHARD CARL DEHMEL
BY
ATTORNEY.

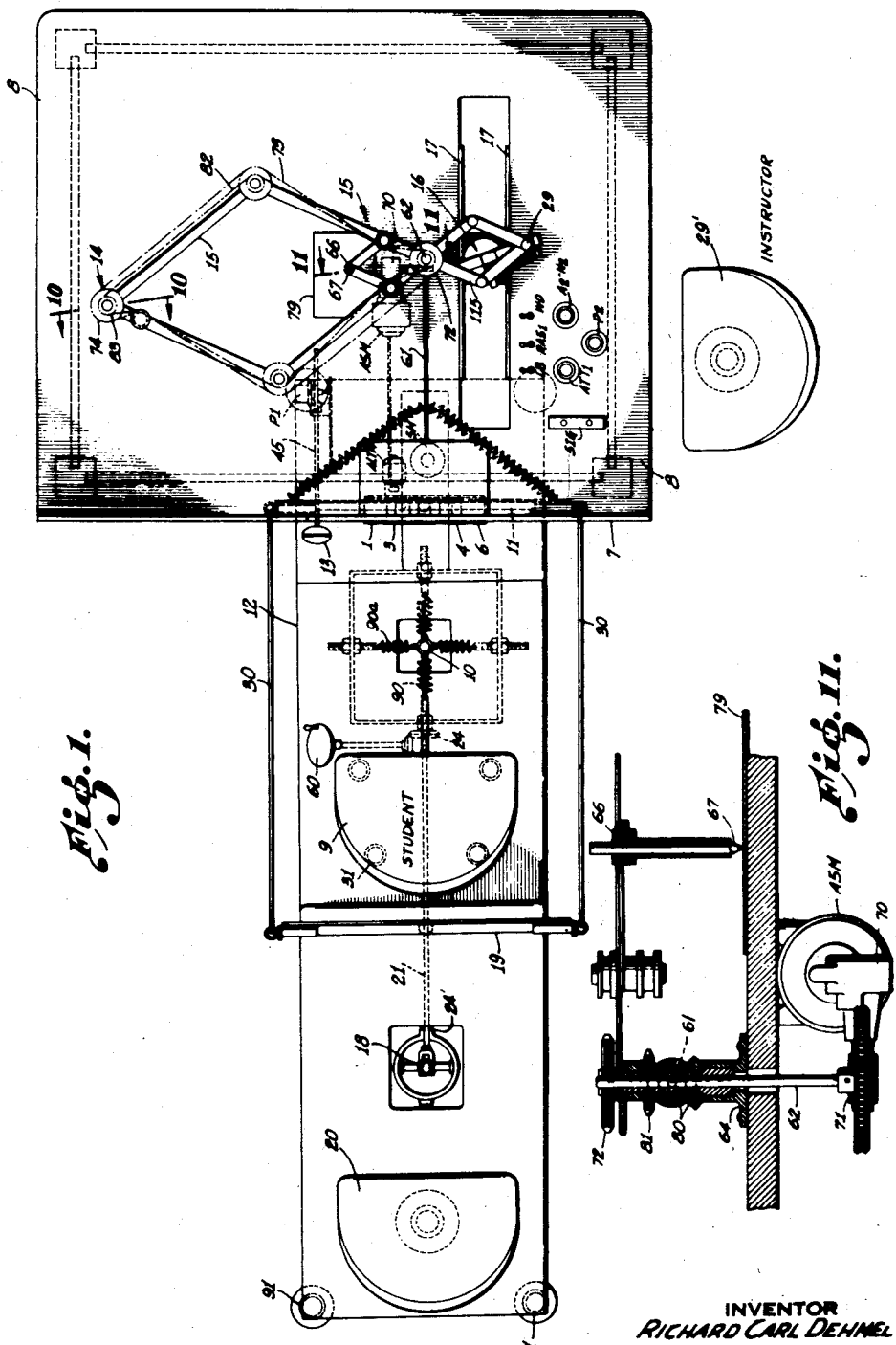

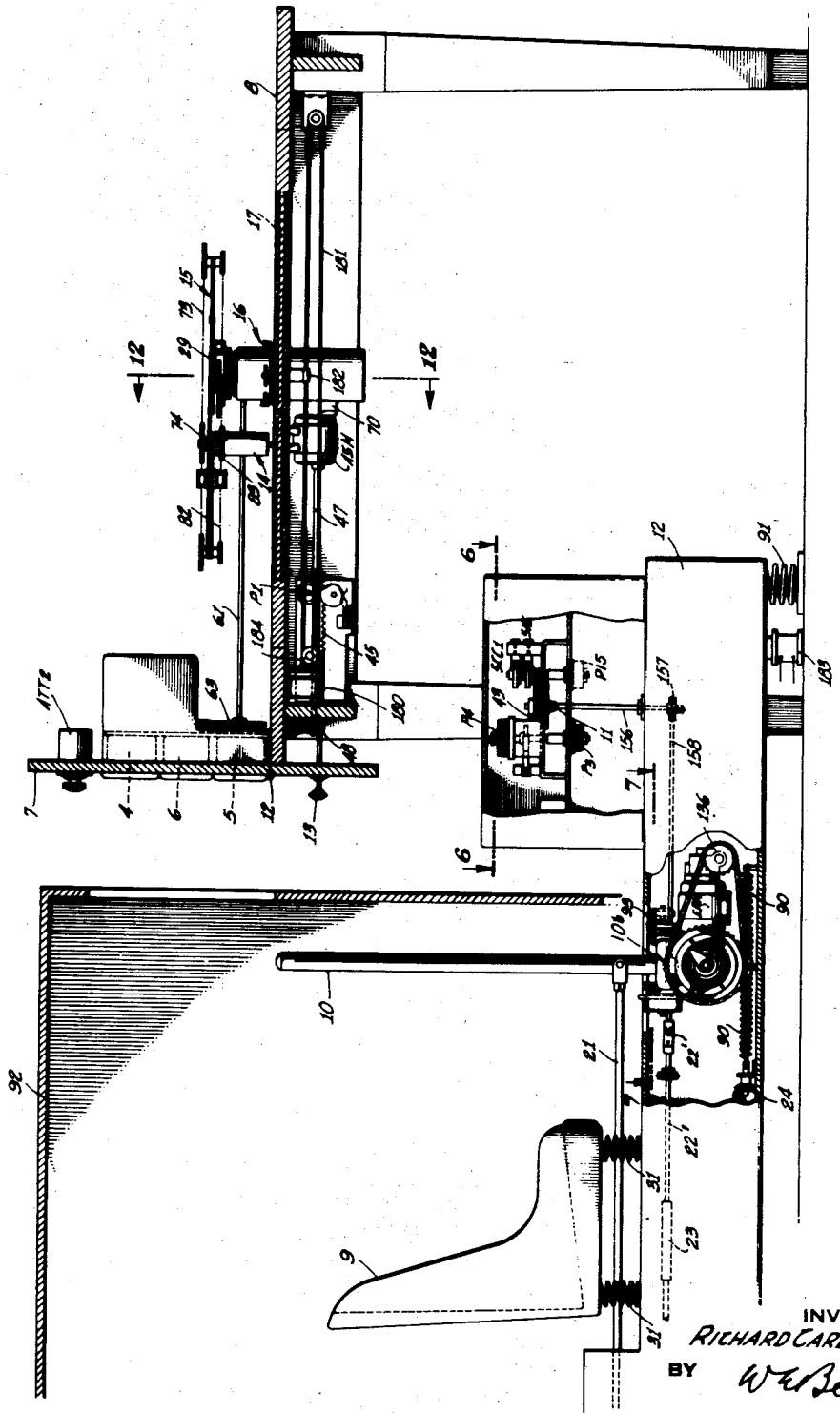

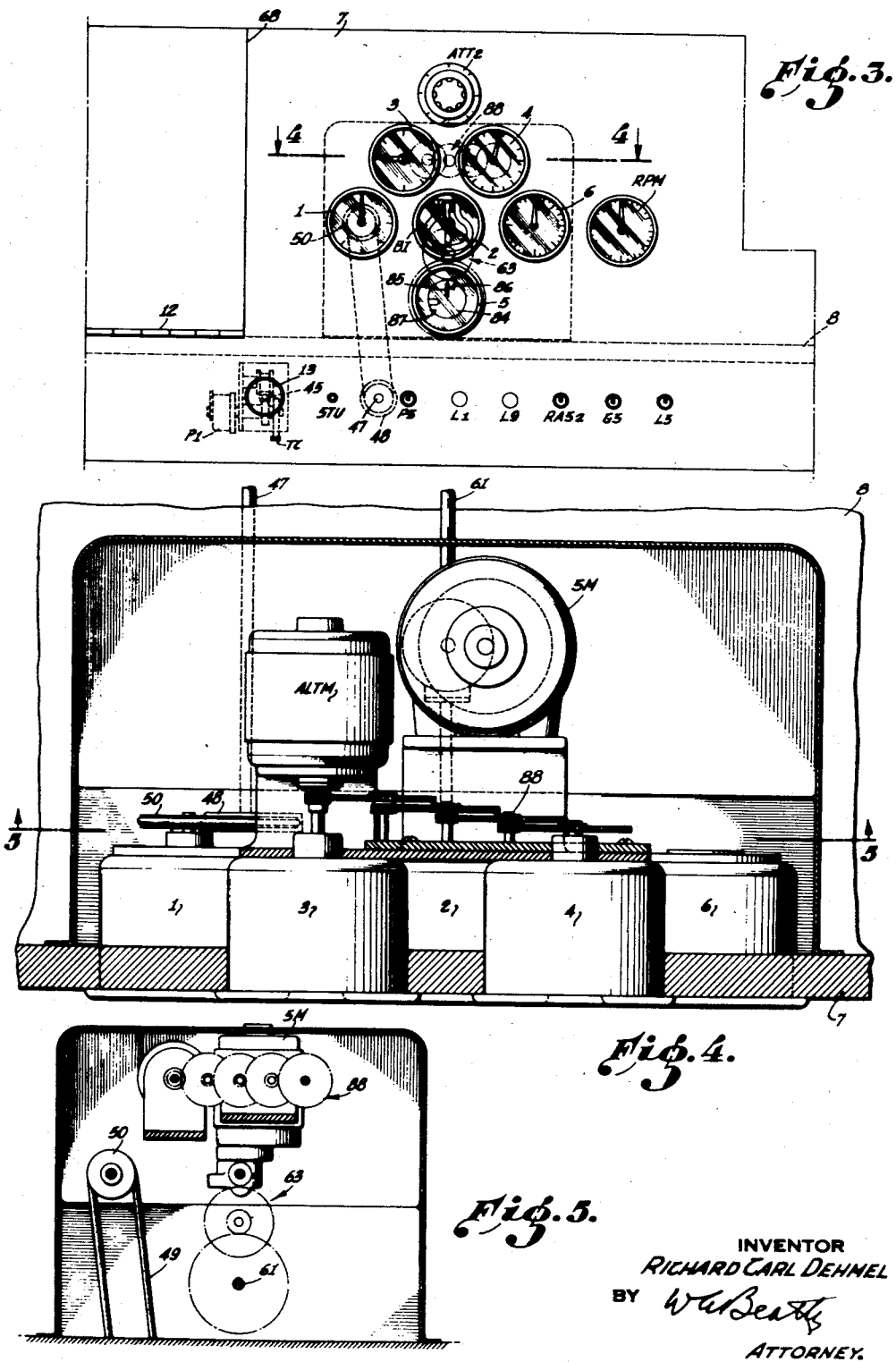

Jan. 10, 1950     R. C. DEHMEL     2,494,508
MEANS FOR AIRCRAFT FLIGHT TRAINING
Filed June 18, 1941     10 Sheets-Sheet 5
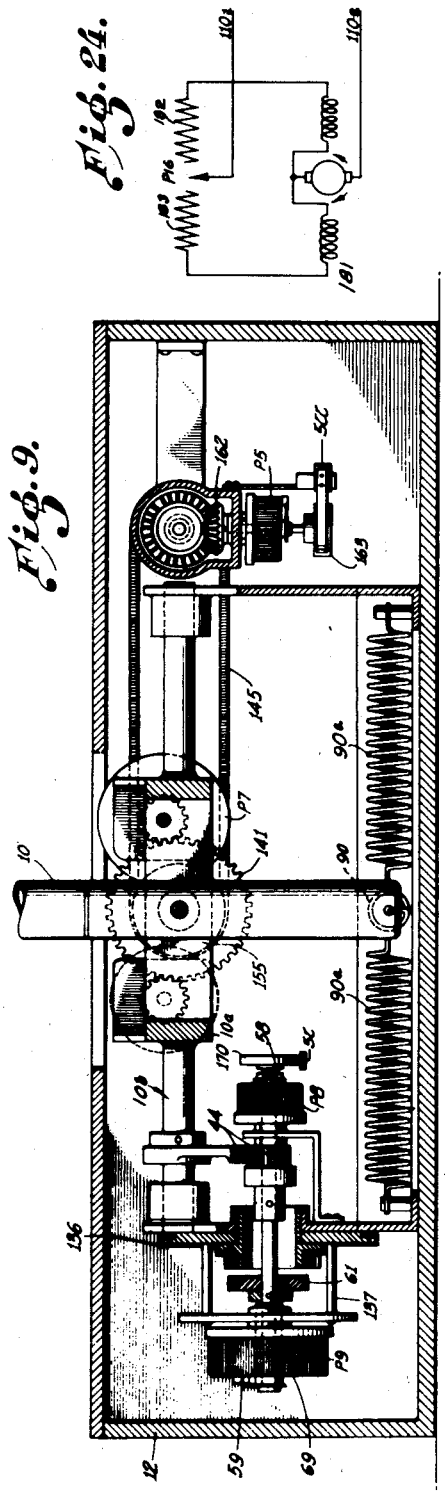
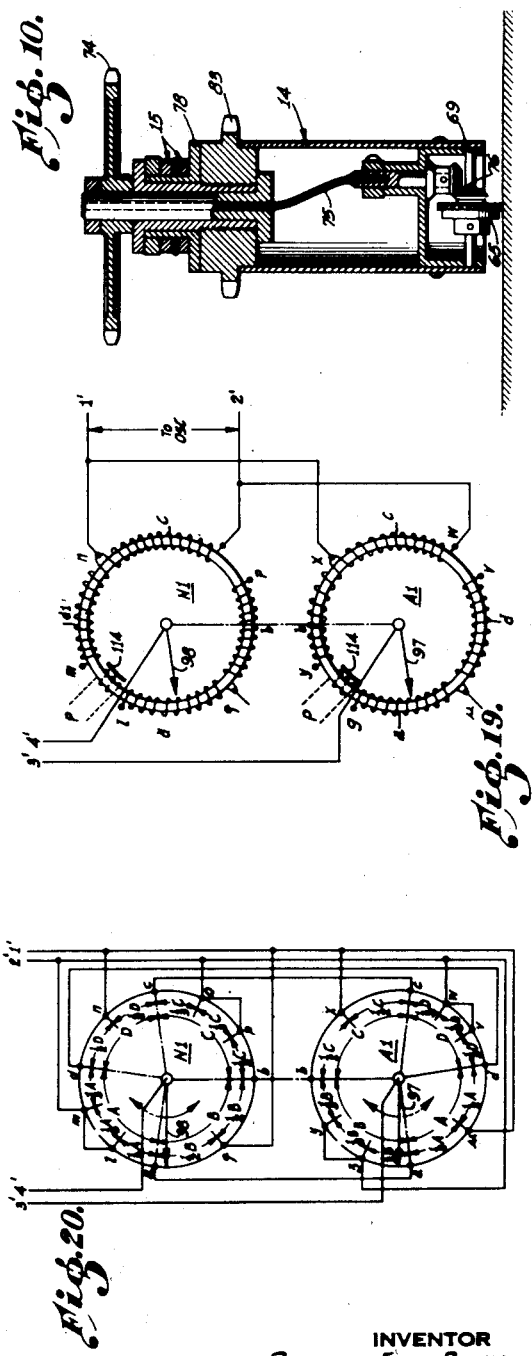
INVENTOR
RICHARD CARL DEHMEL
BY
ATTORNEY.

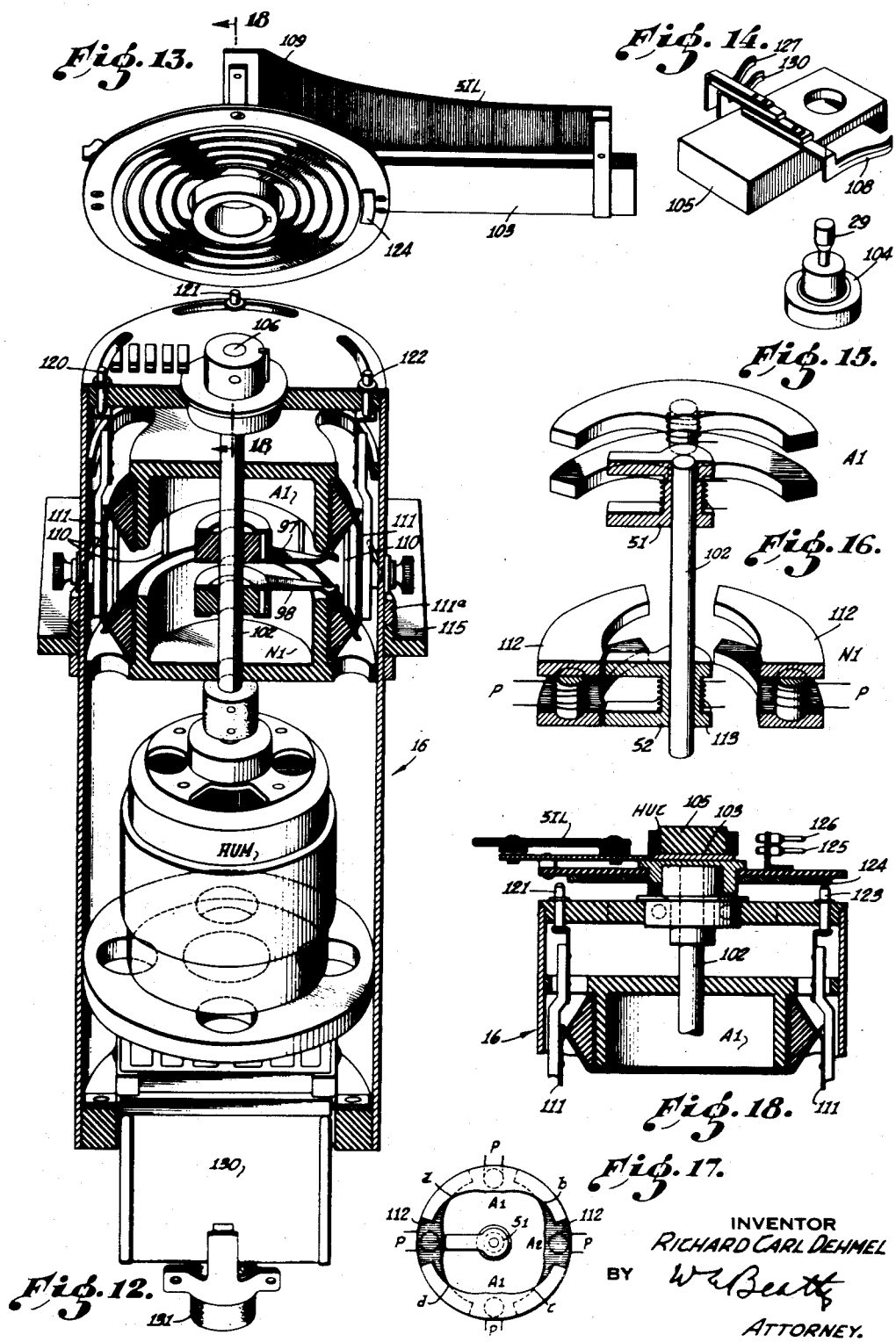

Jan. 10, 1950     R. C. DEHMEL     2,494,508
MEANS FOR AIRCRAFT FLIGHT TRAINING
Filed June 18, 1941     10 Sheets-Sheet 7
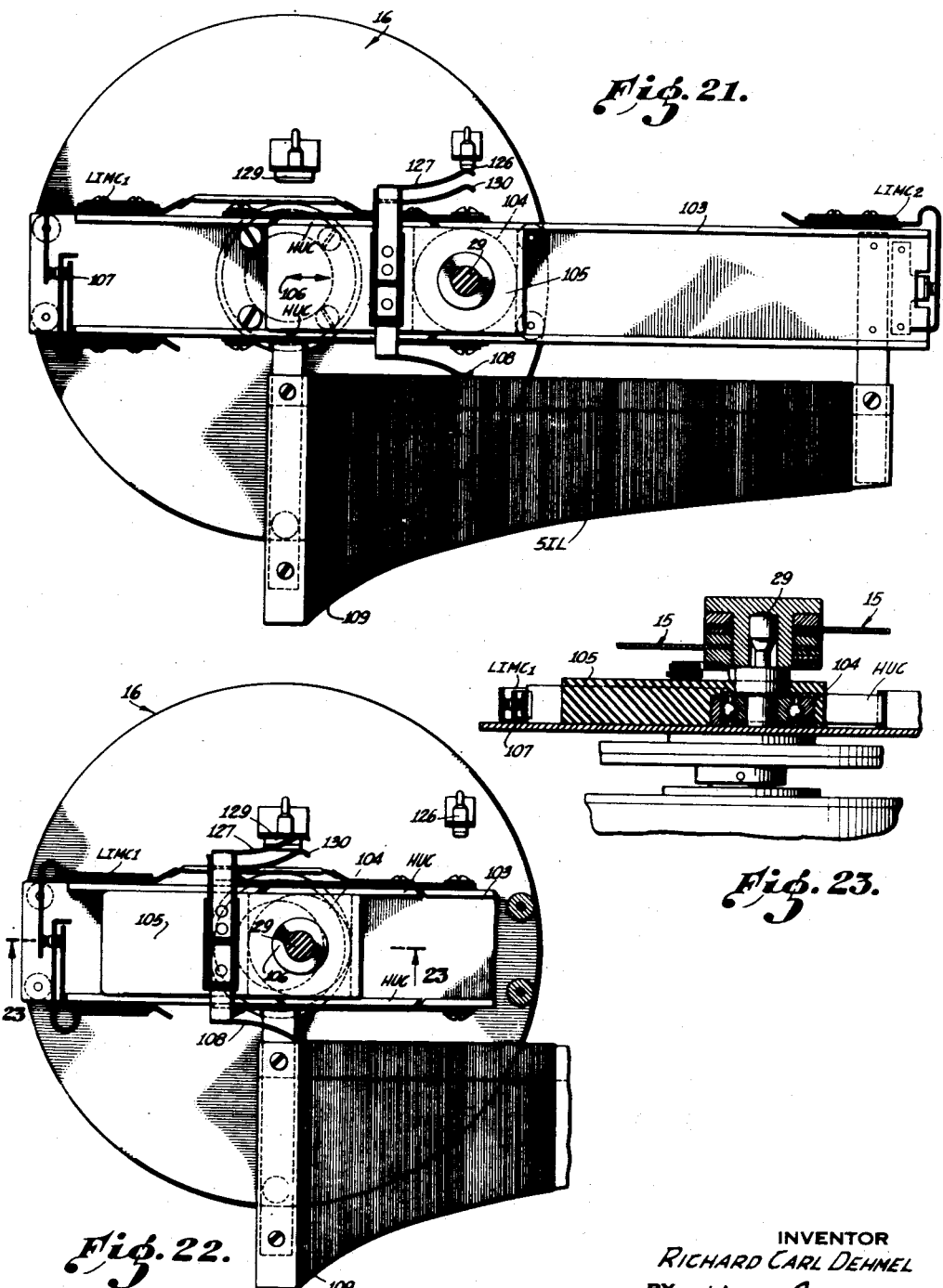
INVENTOR
RICHARD CARL DEHMEL
BY
ATTORNEY.

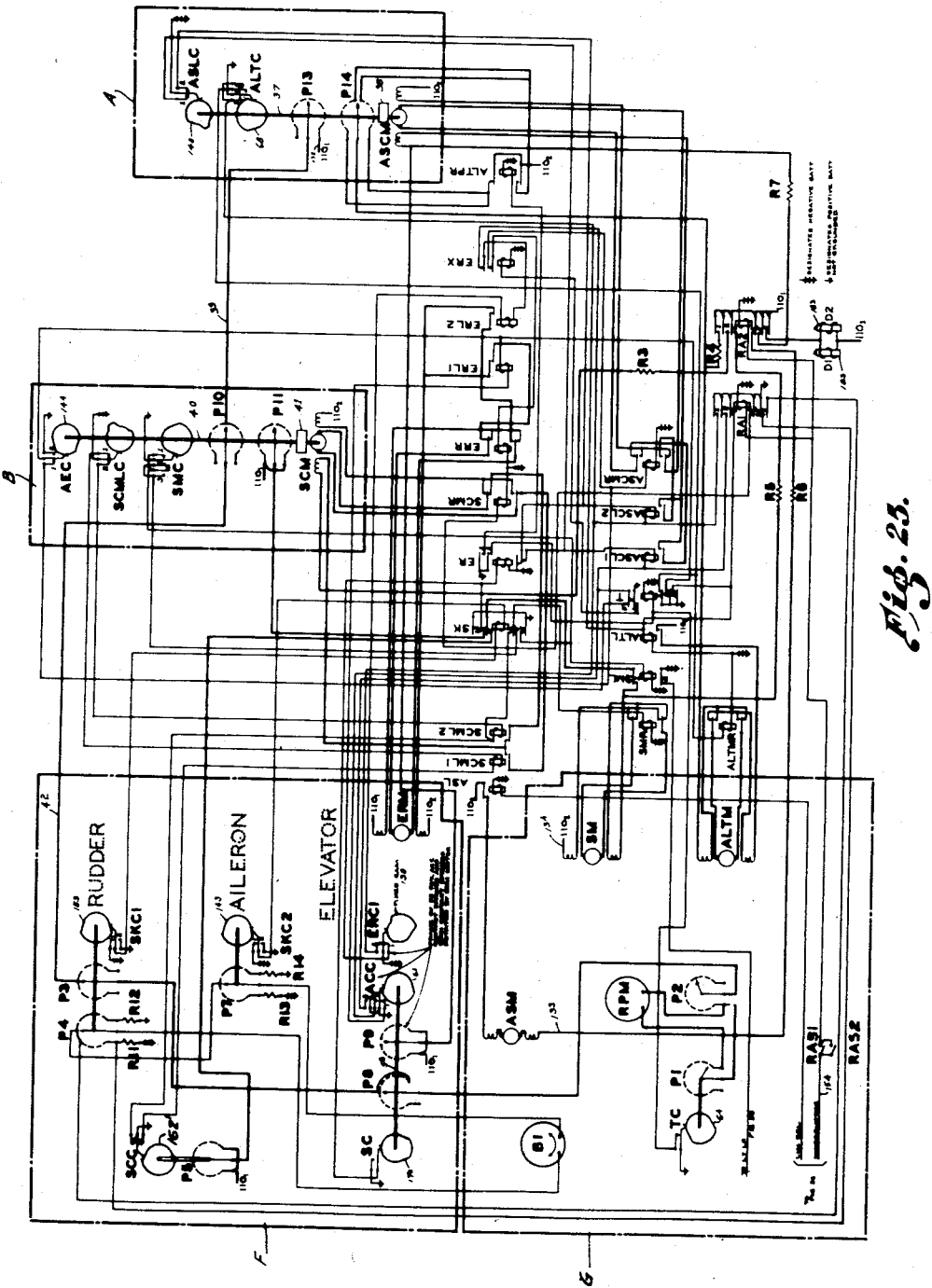

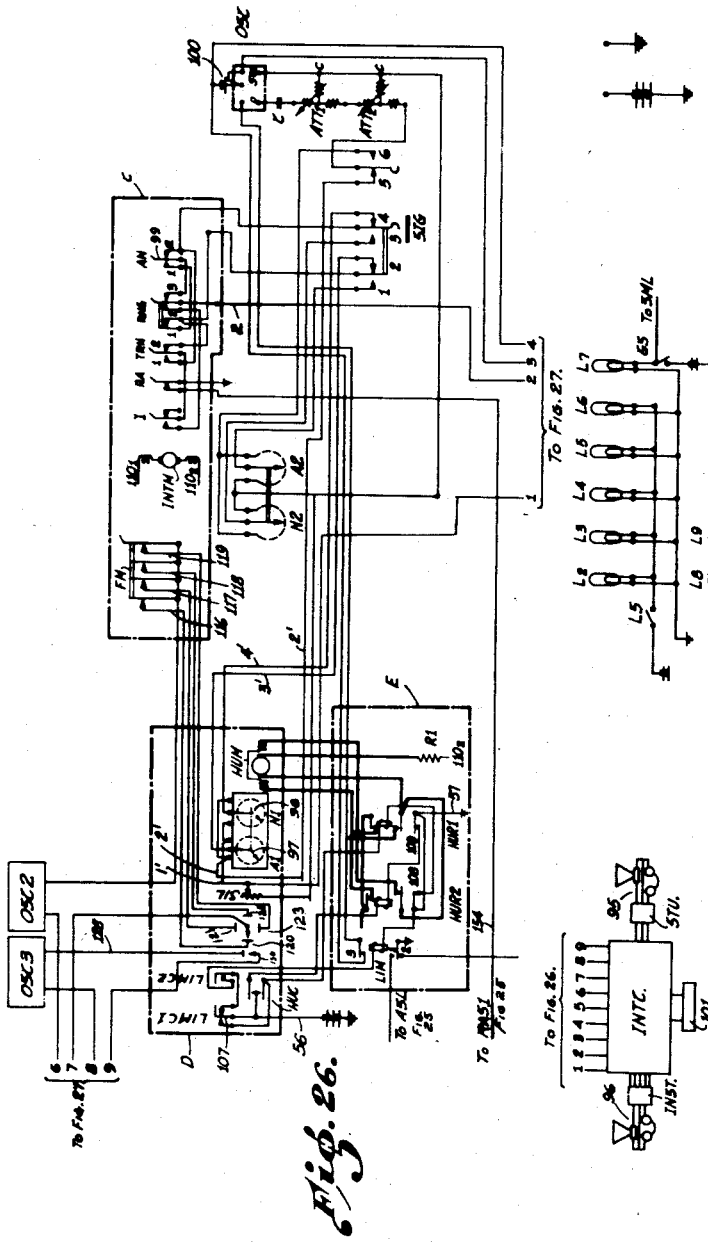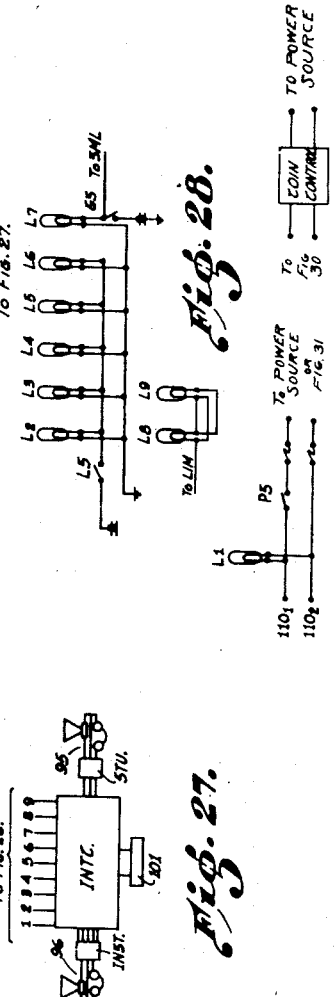

Jan. 10, 1950    R. C. DEHMEL    2,494,508
MEANS FOR AIRCRAFT FLIGHT TRAINING
Filed June 18, 1941    10 Sheets-Sheet 10

INVENTOR
RICHARD CARL DEHMEL
BY W. Y. Beatty
ATTORNEY.

Patented Jan. 10, 1950

2,494,508

UNITED STATES PATENT OFFICE 2,494,508

MEANS FOR AIRCRAFT FLIGHT TRAINING

Richard Carl Dehmel, Los Angeles, Calif.

Application June 18, 1941, Serial No. 398,590

45 Claims. (Cl. 35—10.2)

My invention relates to means for acquainting student pilots with the response of aircraft to the movement of its controls and for training pilots to fly "blindly" by the use of instruments alone. It is also the purpose of my invention to train pilots in the orientation and let down procedures used on radio ranges.

In general, the apparatus of my invention comprises flight equipment, a charting device, and orientator equipment. The flight equipment comprises electro-mechanical facilities controlled by an aileron, rudder, elevator, throttle and stabilizer to give the same instrument readings as would be obtained with an actual aircraft in flight. The instruments duplicate the indications of a convention ball bank indicator, rate of turn meter, rate of climb indicator, altimeter, air speed meter, a true direction (gyro) compass, and a magnetic direction compass.

A charting device is provided for tracing the path of the simulated flight over the range. This equipment is arranged so that the pilot may observe the charting device or this device may be obscured from his vision. The apparatus is equipped with an intercommunicating telephone circuit so that the attendant or instructor may talk with the student or simulate the transmittal of weather broadcasts or other airway information.

The orientator equipment comprises an automatic signal controlling device operated either manually by the instructor and/or by the electro-mechanical circuit referred to above. This signal controller transmits signals to the pilot that duplicate those received in an actual aircraft during its flight in any desired radio range. The signals may include a fan marker, Z marker, glide path and/or, landing marker beacon, and station identification as well as the A and N signals. The automatic signal controlling device is so arranged that wind drift may be introduced, and, in addition, the beams of the range may be shifted to reproduce double beams, dog-legs or other irregularities.

The apparatus of the trainer may be regarded as consisting of two assemblies each usable independently or in combination with the other. One of the assemblies consists of aircraft controls and associated circuits necessary to reproduce, on a group of instruments, the same readings as would occur on the flight instruments of an actual aircraft subjected to like control manipulation. This is the Instrument flight training assembly. The other assembly comprises facilities for practising in the determination of the position of an aircraft flying in a radio range. This is the Orientator assembly.

For further details of the invention reference may be made to the drawings wherein—

Fig. 1 is a plan view of pseudo aircraft controls and a traversing table with signal and charting equipment according to the present invention.

Fig. 2 is an elevation of the apparatus of Fig. 1 partly in section.

Fig. 3 is a front elevation of the instrument panel of Figs. 1 and 2.

Fig. 4 is a sectional view on line 4—4 of Fig. 3.

Fig. 5 is a sectional view on line 5—5 of Fig. 4.

Fig. 6 is a plan view of the rudder control on line 6—6 of Fig. 2.

Fig. 7 is a plan view of the "stick" control on line 7—7 of Fig. 2.

Fig. 8 is a sectional view on line 8—8 of Fig. 7.

Fig. 9 is a sectional view on line 9—9 of Fig. 7.

Fig. 10 is a sectional view of the charting head on line 10—10 of Fig. 1.

Fig. 11 is a sectional view of the pantograph and recording pencil support on line 11—11 of Fig. 1.

Fig. 12 is a vertical section of the controller in perspective on line 12—12 of Fig. 2.

Fig. 13 is a perspective view looking underneath of the operating arm which fits on top of the controller of Fig. 12.

Fig. 14 is a perspective view of a slider mount for the arm of Fig. 13.

Fig. 15 is a perspective view of the slider for the mount of Fig. 14.

Fig. 16 is a sectional perspective view of an alternative controller element which may be used instead of Fig. 12.

Fig. 17 is a plan view of Fig. 16.

Fig. 18 is a sectional view on line 18—18 of Figs. 12, 13.

Fig. 19 is an alternative control element for Fig 12.

Fig. 20 is a wiring diagram for the control elements of Fig. 12.

Fig. 21 is a plan view of the arm of Fig. 13 with the contacts in one position.

Fig. 22 is a partial plan view of Fig. 13 with the contacts in another position.

Fig. 23 is a sectional view on line 23—23 of Fig. 22.

Fig. 24 is a schematic circuit showing a modified motor control.

Fig. 25 is a schematic circuit diagram for the apparatus of this invention.

Fig. 26 is a schematic circuit diagram for the signaling circuit and controller of this invention.

Fig. 27 is a schematic telephone circuit.

Fig. 28 is a schematic lamp circuit for the flight instruments.

Fig. 29 is a schematic auxiliary power source.

Fig. 30 is a schematic power source.

Fig. 31 is a schematic coin control circuit.

Fig. 32 is a schematic of a modified circuit of this invention.

INSTRUMENT FLIGHT TRAINING ASSEMBLY

General

Figure 52:
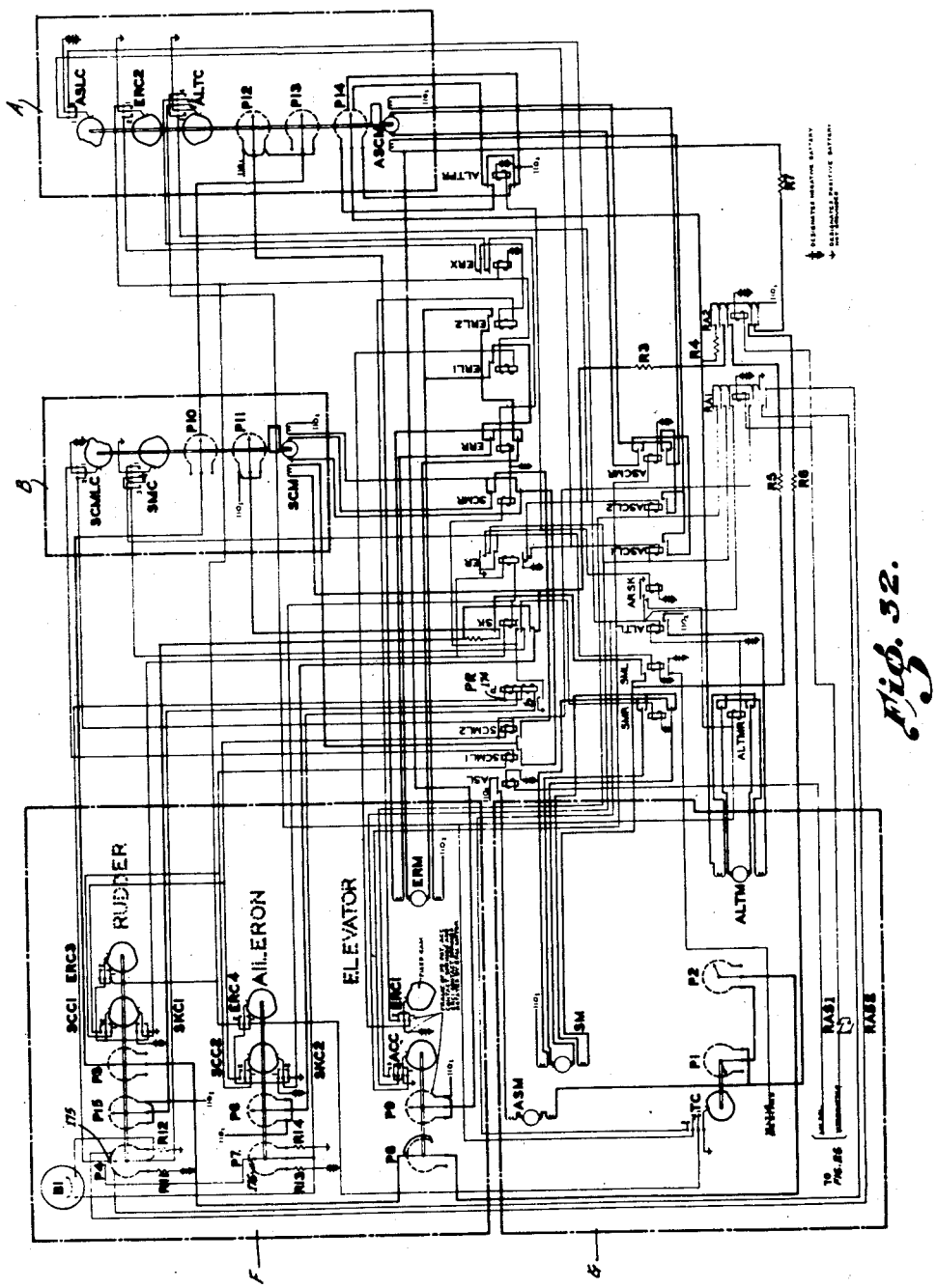

By reference to Figs. 1, 2 and 3 it may be seen that the Instrument flight training assembly comprises a complement of instruments consisting of meter 1 depicting airspeed, the combination meter 2 depicting rate of turn of the aircraft and ball stability, the meter 3 depicting rate of climb, the meter 4 depicting altitude, the meter 5 depicting compass course and a clock 6, each mounted on the instrument board 7 positioned in front of the student pilot seated at 9. A "stick" 10, simulating the conventional aileron-elevator control of aircraft, a rudder 11 and a stabilizer 60 are mounted on a frame 12 for operation by the student pilot. The control 13 simulates the throttle control of an aircraft. Means are provided, Figs. 25 and 32, whereby movement of the controls 10, 11, 13 and 60 result in indications of the meters 1, 2, 3, 4 and 5 as in an actual airplane. Hence the trainer of my invention provides a method and means whereby a student may learn to fly by the use of instruments alone. He may practice "blind" flying without the hazard and expense of employing actual aircraft. Pilots already experienced in "blind" flying may improve their technique by practice on this apparatus.

ORIENTATOR

General

A conventional radio range transmits the letter A (.—) and the letter N (—.) in Morse code into adjacent quadrants in such sequence and intensity relationship that these signals overlap along four selected compass bearings to form narrow "on-course" beams. Lateral deviation from these beams results in predominance of either the A or N signal depending, respectively, on whether the deviation is into a contiguous A or N quadrant. Assuming the deviation from the on-course beam is into an A quadrant the A signal will increase in volme while the N signal becomes weaker. This reduction in N signal strength continues to approximately one-third of the angular width of the quadrant where the signal fades to zero. Thereafter substantially only an A signal is heard and this increases in intensity until the bisector of the quadrant is reached. As the flight is continued across this bisector the A signal starts to decrease in intensity. When the flight has reached a position approximately one-third the quadrant width from the next on-course beam, the N signal again becomes audible and continues becoming louder until it again equals the A signal forming another on-course beam. The areas adjacent to a beam and within which both signals can be heard, one louder than the other, are the bi-signal zones. As indicated above, the width of these bi-signal zones is approximately one-third the width of the respective quadrants. All signals increase in strength as the center of the radio range is approached. Directly above the antennas or towers there is a cone of silence, a limited area shaped like an inverted cone, in which all signals fade out. As the aircraft leaves the cone of silence the signals surge back with great volume before they begin to fade as the distance from the station increases.

Sometimes there is a momentary reduction or fading of the signals, or a false cone of silence, at other points along the airway due to atmospheric or local disturbances. To avoid any uncertainty from this cause as to location of the center of the radio range, many ranges are equipped with a Z type marker beacon which emits a distinctive signal in the cone of silence. "Fan" type marker beacons which transmit a fan-shaped radio pattern across the equi-signal zone are often placed 20 miles from the center of the range. The markers around any given radio range station are identified by a succession of single dashes, or by groups of two, three or four dashes to indicate the particular course of the range.

Multiple courses exist at some locations, particularly in mountainous country. That is, the equi-signal zone, which is normally about 3° in width, may be broken up into a number of narrow on-course bands with a total spread of 10° or 15° or even more. A related difficulty is found in bent courses. If the aircraft continues in straight flight under these conditions, the range courses seem to be swinging from side to side.

Wind causes drift of aircraft over a range and if of appreciable velocity may in certain conditions of flight lead the pilot to believe he was on a different course of the range than was actually the case.

To identify the particular range in which a flight is conducted, the A and N signal sequence is interrupted after each twelve successive transmittals to project station identifying signals first in the N pair of quadrants and then in the A quadrants. These signals consist of two letters in continental code. A complete cycle requires 37 seconds. Of this period, 25 seconds are used for the twelve A and N transmittals and twelve seconds are utilized for the station code.

Provision is made at most range stations for simultaneously broadcasting voice with the range signals so that weather reports or other information may be transmitted to the airway.

Inasmuch as like signals are transmitted into opposite quadrants of a range it becomes necessary to identify the quadrant in which the aircraft is flying. It is also necessary to find a range course as quickly as possible from the unknown position. This establishment of position is referred to as orientation.

Orientation may be practised on the apparatus of my invention which in this part comprises a pantograph 15, Figs. 1 and 2, mounted on the fixed pivot 62 in bearing 64, Fig. 11, attached to the traversing table 8 and having a course charting head 14 whose position and movement on the table depict the position and movement of the aircraft on the radio range, said movement being accomplished by hand or by means responsive to manipulation of the controls 10, 11, 13 and 60 as subsequently detailed herein: The pantograph 15 in following the movement of the course charting head 14 moves the pin 29 and thereby operates a signal controller 16 which by virtue only of the positioning of pin 29 varies the relative intensities of the A, N, station identification, Z and fan marker signals to correspond to those that would be received by an aircraft in like position on an actual radio range. The effects of wind drift and beam irregularities may be introduced by displacing the signal controller as in the slide rails 17. The automatic regulation of the signals has great usefulness in that it dispels the confusion which has heretofore existed both in the student and his instructor due to the inevitable lag and errors which attend attempts by the instructor to manually vary the signal strengths to conform to the student's movement of the charting head 14 about the table. In addition the signal controller 16, because of its automatic operation, eliminates the need of the skilled instructor heretofore required for the manual variation of the signal strengths. The freedom from need of such attendant not only provides more satisfactory and economical operation, but makes possible the operation of an orientator from a coin collector switch rendering the orientator operative for a timed interval.

A detailed disclosure of the facilities of my invention now follow. For the sake of brevity, the Instrument flight training assembly and the Orientator assembly will be described in combination, it being clear that either may be used alone. The two assemblies are mechanically linked together for combination use by the ASM motor shaft 62, Figs. 1 and 11 and the SM steering motor shaft 61, Figs. 1 and 2.

The course charting head 14, Figs. 1, 2 and 10, is steerably mounted in the pantograph 15 at the sleeve 18, Fig. 10. The position of the head 14 represents the location of the aircraft on the range, the orientation of the head is the true course and the velocity of the head is proportional to the air speed. Mounted in the joint 66, Fig. 1 is a path tracing pencil 67 which plots the course in reduced scale on map 79, Fig. 1. The dash board 7 mounted at the side of the table 8, is bisected vertically at 68, Fig. 1 and Fig. 3, and the section at the left of the partition is hinged at 12, Fig. 3. Dropping this hinged section forward exposes the course charting head 14 to the pilot seated at 9. The entire traversing table 8 is exposed to any attendant seated at 29'.

The tractive wheel 65, Fig. 10, is rotated on its own axis 69 by the air speed motor ASM, Fig. 1 and Fig. 1 which is responsive to controls 10, 11, 13 and 60 through the circuits, Figs. 25 and 32. The motor ASM is secured to the underside of the traversing table 8. The ASM motor drives the wheel 65 through the reduction gearing 70 and 71, Fig. 11, the shaft 62, sprocket 72, the chain 73, Fig. 1 and Fig. 2, the driven sprocket 74, Figs. 2 and 10, and the flexible shaft 75 which transmits power through the miter gears 76 to the tractive wheel 65 which moves the head 14.

The motor ASM also drives the air speed indicator 1 through the shaft 47 and pulleys 48 and 50, Figs. 2, 3 and 4. The air speed indicator 1 is a tachometer of any standard design but calibrated in terms of air speed units. The tachometer construction which I prefer is the revolving magnet type commonly used for automobile speedometers. However, a vibration tachometer, or an electrical tachometer could be used as alternatives.

To simulate turning of the aircraft, the steerable course charting head 14 is rotated by the steering motor SM, Fig. 1 and Fig. 4, said motor being responsive to controls 10, 11, 13 and 60 through circuits, Figs. 25 and 32. Mechanical connection between the motor SM and head 14 is through the gear train 63, Fig. 5, the shaft 61, the miter gears 80, Fig. 11, the driving sprocket 81, the chain 82, Figs. 1 and 2 and the driven sprocket 83, Figs. 1, 2 and 10. Directly connected to the motor SM is the rate of turn indicator 2. This indicator, like the air speed indicator 1, is a tachometer of any conventional design. It is, however, of zero center construction and is calibrated to show the turning rate in "needle-widths." The type of tachometer which I prefer is the revolving magnet design. Contained in the same housing as the rate of turn indicator is the "ball bank" indicator which comprises a galvanometer BI, Figs. 3 and 25, responsive to controls 10, 11, 13 and 60 through the circuits of Figs. 25 and 32.

Attached to the shaft 61, Figs. 1 and 2, is a compass dial 84, Fig. 3. Inasmuch as the ratio of the miter gears 80 and the sprockets 81 and 83 is unity, the compass 5 indicates the heading of the course charting head 14. Accordingly, the steering motor SM, which controls the rate of turn indicator 2, also performs an integrating operation in positioning the indicator of compass 5. The compass 5 shows either the True heading or the Magnetic heading as desired. It will show True heading on the pointer 85 which coincides with the north of the compass card when the head 14 is travelling north, or it will show Magnetic heading by the pointer 86, which is offset from the True position by the magnetic deviation. In flight training it is frequently desirable to practice the use of the magnetic compass because this type of direction indicator is commonly employed in aircraft. The magnetic compass, however, is subject to spurious rotation while the aircraft is turning and therefore is useless until straight flight has been resumed. To simulate this uselessness of a magnetic compass during execution of a turn I have rendered the compass dial illegible while the steering motor SM is in operation. The method which I prefer for accomplishing this is to use a semi-transparent dial having printing which is legible only by rear illumination as from the L7 lamp 87. This lamp is operated by back contacts on the SML line relay, Fig. 25, which operates the SM motor as described under "Circuit description" to follow. If it is desired to use the compass as a gyro compass which functions reliably during turns, the lamp 87 may be continually operated by the switch GS, Fig. 28. (See Circuit description.)

The rate of climb meter 3 is operated by direct connection to the altitude motor ALTM, Figs. 1, 4 and 5 which is responsive to controls 10, 11, 13 and 60 through the circuits of Figs. 25 and 32. The meter 3 is a tachometer having two-way deflection from zero and calibrated to represent rate of climb. The form of tachometer which I prefer is the moving magnet type. Also driven by the motor ALTM, through gearing 88, Figs. 4 and 5, is the altimeter 4, the indicating element of which is a simple pointer attached to the last gear of train 88. Thus the altitude motor, ALTM, also performs an integrating operation in positioning the indicator of altimeter 4.

Means other than tachometers could be employed for indicating airspeed, rate of turn and rate of climb. For example, it is obvious that galvanometers having suitable scale calibration markings and connection as for instance across the motors ASM, SM or ALTM would serve satisfactorily as airspeed, rate of turn and rate of climb meters. I could also use other means actuated by an intermediate circuit such as Figs. 25 and 32 which are responsive to controls 10, 11, 13 and 60.

Other instruments of my apparatus, as shown in Figs. 1, 2, 3 and 26, are attenuators ATT1 and ATT2 for adjusting the strength of the radio range signals, a meter RPM Fig. 25 depicting an engine tachometer and comprising a galvanometer shunted across the throttle rheostat P1, Figs. 2, 3 and 25, duplicate rough air switches RAS1 and RAS2 for actuating a feature of the circuit which causes all instruments to have agitated deflections such as occur with aircraft flying in rough weather. The stabilizer 60 varies the tension on the elevator spring 90, Figs. 1, 2 and 7 through the screw and bevel gears 24. An average air speed control P2, Figs. 1 and 25 is provided to adjust the average speed of the airspeed motor ASM to any desired "cruising" value thereby enabling the student to solve problems at a faster rate as he acquires proficiency. A manual signal divider A2—N2 comprising two potentiometers operated by a common potentiometer enables the instructor seated at 29' to manually vary the intensity of the radio range signals for discussion or instruction purposes. The key SIG permits transferring between the automatic signal regulator 16 and the manually operated potentiometers A2—N2. There is a power switch PS for starting the apparatus, a signal lamp L1 indicating operation of switch PS and limit lamps L8 and L9 indicating overtravel of the pantograph 15.

In addition to the directly operated controls described above, there also are three auxiliary control units which are important features of my invention. These are the steering control motor SCM panel, Fig. 25, which includes the apparatus within the broken line B—B, the air speed control motor ASCM panel, which includes the apparatus shown within the broken line A—A, and the elevator restoring motor ERM assembly, which actuates the frame of potentiometer P9, the contact spring assemblies ACC and ERCI. The SCM and ASCM panels have as their purpose the introduction of time delay between the operation of the rudder, aileron or elevator controls and the response of the instruments 1, 2, 3, 4, 5, and RPM and the course charting head 14 to the new movement of the pseudo-aircraft. Moreover, these panels also provide means for simulating the appropriate holding of the aircraft in a maneuver such as a properly banked turn with substantially relaxed aileron and rudder as in actual aircraft. The ERM assembly introduces the restoring characteristic of aircraft to level flight and makes necessary the holding of control pressure in certain maneuvers such as climbs and glides. Instead of employing the motor ERM for shifting and restoring circuit elements P9, ACC, and ERCI, a dash-pot solenoid may obviously be used. A restoring circuit similar to the ERM assembly of the elevator may also be employed on the aileron to simulate the overbanking tendency in steep turns and the recovery tendency in shallow turns. Also, a comparable restoring circuit may be associated with the rudder to make necessary the continued application of slight rudder pressure during turns if such refinement is desired.

A further feature of my invention is the ability to easily provide dual controls in either tandem or side-by-side arrangement to permit an instructor to assist the student in performing any maneuver or in the correction of errors. To provide these dual control facilities it is merely necessary to couple the rudder bars and the "sticks" of the two control positions together as by the shafts 30, 21, and 22, Figs. 1 and 2. As indicated by Fig. 7, the shaft 22 is connected by coupling 22' to the gear 141 for transmitting aileron control movement between sticks 10 and 18. Such movement stresses the aileron springs 90a. The student's seat is mounted on the springs 31 to provide a "floating" feeling, thereby accelerating the tendency toward vertigo. Likewise the frame 12 is supported by springs 91, Figs. 1 and 2. The pilot and instructor seated at 9 and 20 are enclosed by a shroud 92 to obscure the surroundings from the vision. This shroud is affixed to frame 12 at 93.

CIRCUIT OPERATION

The oscillator OSC, Fig. 26, produces a tone at approximately 1000 cycles per second, which is fed from the O terminal through the volume limiting attenuators ATT1 and ATT2 located as may be seen in Figs. 1 and 3 at the instructor's and student's positions respectively, through the normal contact 5 of the SIG key, to the complete winding of the potentiometers of the signal controller 16, shown in simplified form at A1 and N1, but shown in detail in Fig. 20 and described later; through the slide wire rheostat SIL shown also in Figs. 13, 21, and 22, and back to the oscillator OSC 500 ohm terminal. A path for this tone to the telephone circuit, Fig. 27, may be traced from the A1 potentiometer, slider 97 through the normal contacts 2 of the SIG key to the RNG contact 1 and the AN contact 1 (when operated) of the interrupter assembly shown enclosed in broken lines at C, to the RNG contact 3 and over lead 2 to Fig. 27. Likewise a tone path may be traced from the N1 potentiometer slider 98, the normal contacts 4 of the SIG key to contact 2 on the AN spring assembly, to the RNG contact 3 and lead 2 to Fig. 27. Return tone current from the telephone circuit Fig. 27 is over lead 1, to the A1 and N1 potentiometer windings. The contact assemblies I, RA, TRN, RNG, and AN are operated by cams driven by the INTM motor. The AN contacts interrupt the steady tone from the A1 and N1 potentiometer arms 97 and 98 respectively into A and N signals respectively and pass this current through the swing spring 99 of the AN contact assembly to the RNG contact 1 and thence to the No. 2 lead to Fig. 27 and the receivers 95 and 96. After twelve A and twelve N signals the range contacts RNG operate to transfer the head receiver lead No. 2 from the AN springs to the identification contacts I which interrupt tone received first from potentiometer N1 through the make contact 2 of the transfer spring TRN and then from the A1 potentiometer through the break contact 1 of the transfer spring TRN, which thereby transmits the station identification signal formed by the cam operated contacts I first to the N channel and then to the A channel. The stud operated break contact 1 of the RNG range springs prevents a path from the A1 potentiometer arm 97 to the AN contacts while identification signals are being transmitted. This is a feature to prevent "keying clicks" which would otherwise occur whenever the A1 and N1 potentiometer arms 97 and 98 are rotated near to the points where the oscillator connects to the potentiometer windings. With the arms in such position the oscillator output is shunted by a low impedance during the momentary bridging of the make and break AN contacts 1 and 2 each time the lever spring 99 swings.

The RA contacts furnish interrupted ground from the source Fig. 29 to the relay RA1 of the aircraft control circuit, Fig. 25, to operate the "rough air" feature of that circuit under control of the switch RAS1, Figs. 25, 1 and 3, which is manually operated by the instructor.

When the SIG key is operated, the signals furnished to the telephone circuit of Fig. 27 are directly under control of the manually operated potentiometers A2 and N2, Fig. 26, located at the instructor's position, see Fig. 1.

Fig. 27 provides a telephone circuit for receiving the range signals and for intercommunicating between the student and the instructor. Apparatus includes the student's and instructor's telephone sets 95 and 96, their respective STU and INST jacks, the INTC key and a compensating circuit shown at 101.

The INTC key has three positions of operation, namely, normal, locking, and non-locking. With the INTC key in the normal position and the telephone sets in their respective jacks, the transmitters and receivers of the two sets are connected in series with power supply over leads 3 and 4 from source 100 and the two sets are connected in parallel to the range signal interrupter circuit C of Fig. 26 over leads 1 and 2.

With the INTC key operated to the non-locking position the student's and instructor's sets are connected in series with power from source 100 furnished over leads 3 and 4 for the purposes of intercommunication and the sets are disconnected from the range signal leads 1 and 2.

With the INTC key in the locking operated position the receivers only of the two telephone sets are connected across the range signal leads 1 and 2.

If the instructor's set is removed from the INST jack, the student's set is left connected to leads 1, and 2 in series with the compensating network 101. Also lead 3 is opened by operation of the jack INST to reduce current consumption from the power source 100.

The automatic signal controller 16 shown in Figs. 1 and 2 and in Figs. 12 to 23, inclusive, continually varies the relative intensity of the A, N and identification signals to correspond with the position of the psuedo aircraft in the range. The signal controller also furnishes Z and fan marker beacon signals.

The controller consists of two attenuating elements A1 and N1 and operated by a common shaft 102 as shown in Fig. 12. This shaft is rotated by the grooved arm 103 shown in Figs. 13, 21, and 22. Sliding in the groove of this arm is a ball bearing 104, Fig. 15, attached to the pantograph 15 Figs. 1 and 2 by pin 29, Figs. 1, 15, and 23. Any movement of the course charting head 14, Figs. 1 and 2, causes a proportionate movement of pin 29 and hence a displacement of the slide 105, Fig. 14, in the groove of the controller arm 103 and/or rotation of the arm 103. If the head 14 traverses so that pin 29 moves in a line directed substantially through the center of the controller shaft 102, the center being indicated at 106, Figs. 12, 21, and 22, there will be insufficient or no side pressure on the arm of the controller to rotate it the 180° which are necessary to permit the ball bearing to continue its travel. To provide the required rotation of the arm 103 in such instances a hunting motor HUM, Fig. 12, is connected to the controller shaft 102. This motor is under control of the hunting contacts HUC, Figs. 21 and 22. These contacts extend along the sides of the grooved arm 103 and are of such length that they may be contacted by the bearing 104 whenever the bearing is near the center 106 of the controller shaft 102. The bearing 104 carries negative current from the source Fig. 29 and when it exerts side pressure against either HUC contact, the HUR1, Fig. 26, or HUR2 relay (as the case may be) operates to close its respective contacts to supply power from source Fig. 30 to the hunting motor HUM which rotates in the direction of the made HUC contact. Any over-rotation will cause the slide to contact the opposite HUC contact closing its associated relay and operating the motor in a reverse direction. Thus the HUM motor causes the arm 103 of the controller 16 to hunt between the HUC contacts. To assure rotation of the arm 103 in the event the movement of the pantograph 15 is so rapid that the arm can not immediately follow, an additional safety make contact 107, Figs. 21, 23, and 26, is provided on the limit contact LIMC1. The circuit diagram within the broken lines D of Fig. 26 is a schematic of the controller shown in Figs. 12 and 13. Operation of this contact 107 by over-travel of the slide 105 beyond the controller center 106 closes the relay HUR1 causing the motor HUM to rotate the arm 103 until the slide 105 snaps away from the LIMC1 contact 107. This snapping action results from the slide 105 having passed the pivoting center 106 of the controller arm 103. To prevent simultaneous operation of the HUR1 and HUR2 relays due to any bridging that may occur between the HUC contacts or slow release of the HUR1 or HUR2 relays, the energizing current for these relays is furnished through break contacts 108 and 109 on the alternate relay. The resistance R1 limits the torque of the HUM motor and thereby determines its hunting rate.

If the slide 105 of the controller 16 over-travels to reach either end of the arm 103, the (break) limit contacts LIMC1, Figs. 21, 22, and 26, and LIMC2 operate to release contact 1 of the LIM relay, Fig. 26, which removes power from the ASL relay winding Fig. 25. The ASL relay released stops the ASM motor which propels the tractive wheel 65 Fig. 10 of the pantograph 15. The LIM relay released furnishes power through its contacts 2 to the limit lamps L3 and L4, Fig. 28, located at the student and instructor's positions respectively, and the LIM relay contact 3 opens power from source 100 to the oscillator OSC discontinuing the delivery of signals.

Attached to the slide 105 of the controller arm is the spring 108, Figs. 14, 21, and 22, which contacts the resistance SIL. This resistance is taper wound to cause rapid increase in signal strength as the center of the arm is approached. The pivot center 106 of the controller arm 103 corresponds to the center of the radio range. The winding 109 of the resistance SIL is terminated just short of the center 106 of the arm, causing the signal circuit to open near the center and form a cone of silence over the center of the range. It is obvious, of course, that instead of employing the resistance, which I prefer, other attenuating means, such as a variable magnetic coupling between an input and output coil, or variation in the impedance of a series coil, could be used as attenuating means and could be operated by movement of pin 29 with respect to the center 106.

The on-course beams, the bi-signal and pure signal intensity distributions simulating the signals of a radio range are obtained from the A1 and N1 potentiometers of Fig. 12 and Fig. 20 as follows. Inasmuch as the potentiometers are shown positioned face to face in Fig. 12, the diagram of Fig. 20 shows the connections juxtaposed, the sliders 97 and 98 travelling together as shown in Fig. 20 by solid arrows respectively or by dotted arrows respectively.

The leads 1' and 2' of Fig. 20 are the leads 1' and 2' within the broken lines D of Fig. 26 and after lead 1 passing through the attenuating resistor SIL, Fig. 26, and Figs. 21 and 22, they connect to the oscillator OSC. The leads 3' and 4' of Fig. 20 are the leads 3' and 4' within the broken line D of Fig. 26 and after passing through the key SIG connect to the interrupter shown in broken lines at C. The sectors A and C form the "A" signal quadrants of the radio range and the sectors B and D form the "N" signal quadrants of a radio range. The points $a$, $b$, $c$, and $d$ correspond to the bearings of the range courses.

Connection from oscillator lead 1' to the potentiometers A1 and N1 is at the points where the "A" and "N" signal current is to be a maximum. This is approximately at the bisector of each quadrant or the points $u$ and $x$ on the A1 potentiometer and $n$ and $q$ on the N1 potentiometer. Some of the common connections between the A1 and N1 potentiometers are shown at 110 on Fig. 12. Inasmuch as the bi-signal zones are formed by overlapping of the N signal in the A quadrants, the tone return connections to lead 2' are made in the quadrants adjacent to those having tone input connection from lead 1'. These return connections are shown at $v$, $w$ and $y$, $z$ on the A1 potentiometer and at $l$, $m$ and $o$, $p$ on the N1 potentiometer. The points of return tone connection are at approximately 1/3 the angular quadrant width from the beam points $a$, $b$, $c$, and $d$, so as to provide a bi-signal zone in which the fading signal attenuates to inaudibility at about one-third the angular width of the quadrant. At the points $a$, $b$, $c$, and $d$ corresponding to the bearings of the range courses, the potential of the tone current in both potentiometers must be equal. This may be accomplished by properly proportioning the impedance around the windings of the potentiometers. However, a method which I prefer for establishing potential equality between the corresponding points $a$, $b$, $c$ and $d$ on the A1 and N1 potentiometers respectively is to strap them together. By making the position of these straps adjustable, one signal controller can be employed for duplicating the signal distribution of any of a large number of ranges having different course bearings. In my apparatus I have made the straps adjustable by making them movable elements, two of which are shown at 111. To assist in the proper positioning of the elements 111, I have indexed the ring 111a to show compass bearings.

With the above potentiometer connections and the resistance SIL it will be seen that as the controller shaft is rotated through 360°, a signal pattern will be obtained which duplicates the pattern of actual radio ranges.

While I prefer the use of the simple potentiometers connected in the manner above described for varying the signals to correspond to those of a radio range, other forms of attenuators may be employed. One of these forms is the modification shown in Figs. 16 and 17. A primary winding P carrying current from the oscillator OSC of Fig. 26 induces a tone in the secondary coil S1 of the N1 attenuator by magnetic coupling through the poles 112 and the armature 113, the intensity of the induced tone being dependent on the air gap between the poles 112 and the armature 113. By suitably shaping the poles 112, the signal induced in coil S1 may be caused to vary in any desired manner. A similar inductive unit is provided for the A1 attenuator. This is positioned with respect to the N1 unit so that the points of equal induction to the coils S1 and S2 occur at the on course bearings $a$, $b$, $c$, and $d$, Fig. 17. The position of the poles may be made adjustable to vary the bearings of the points $a$, $b$, $c$, and $d$ as desired.

Another modification employing inductive attenuator units is shown in Fig. 19. A1 and N1 are toroidal coils with sliders 97 and 98 contacting the toroidal winding. Tone input from the oscillator is to leads 1 and 2 as before in Fig. 20, and leads 3' and 4' connect to the interrupter shown within the broken lines C of Fig. 26. Tone is inductively induced in the remaining windings of each toroid respectively, the direction of the winding and the distribution of turns being such as to provide the desired signal distribution. Instead of supplying oscillator current to leads 1 and 2, this current may be supplied to the primary coils shown dotted at P. If such primary coils are employed, the contacts 97 and 98 are prevented from contacting said primary coils by means of the insulating elements 114.

A support 115, Fig. 12, is provided in which the controller 16 is rotatable. This support is indexed with respect to the ring 111a so that the degree of rotation of the controller in the support can easily be read. Rotation of the controller in the support has the effect of rotating the entire radio range with respect to the traversing table, which is a feature that is useful in certain training exercises. However, a still more important feature is made possible by this arrangement, namely, the simulation of bent radio beams and curvelinear wind drift.

The controller is mounted by support 115 in the guide rails 17, Fig. 1, which permit lateral displacement of the controller, thereby making it possible to shift the position of the pseudo radio beam with respect to the pseudo position of the aircraft on the course as represented by the position of the charting wheel 65 on the traversing table 8. Thus I can create the effect of double beams, dog-legs, and similar irregularities of the range by shifting the controller in the guide 17 during the pseudo-flight of the trainer. Wind drift may be introduced by continuous movement (manual or otherwise) of the controller 16 along the guide. Fig. 2 shows a motor 180 with reduction gear 184 and connecting link 182 for mechanically displacing the controller 16 in the guide rails 17, by means of cord 181.

Connection from the controller to the associated circuits is by the separable plug 130 and the cable 131. Since it is possible to rotate the entire range by rotating the controller in the support 115, one set of guide rails 17 are required to obtain windage in any direction.

Fan marker beacon tone is furnished by oscillator OSC2, Fig. 26, and interrupted by the cam operated contacts FM to form fan marker signals which are provided along the on-course beams by connection over leads 116, 117, 118, and 119 to contacts 120, 121, 122, and 123, respectively, of the controller shown in Figs. 12 and 18. These contacts are movable respectively with each of the on-course beam strapping elements 111. The commutator segment 124 is connected to contact 125, and as segment 124 communicates with any of the four adjustable fan marker contacts 120, 121, 122, or 123, tone corresponding to that marker appears at contact 125 and is connected to 126 when the spring 127 on the slider 105 is opposite the contacts 125 and 126. The distance of the contacts 125 and 126 from the controller center 106 is equivalent to the distance of the simulated fan marker from the center of the radio range. From contact 126 the marker tone is transmitted to the receiving circuit of Fig. 27 over lead 7, where it is superimposed on the receivers. The return path to the oscillator OSC2 is over lead 6.

Z marker beacon tone is provided by oscillator OSC3, Fig. 26, which is connected over lead 128 to contact 129, Figs. 21 and 22. When spring 130 of slider 105 communicates with contact 129, which is placed along the center line of the controller center 106, the tone on contact 129 is connected to a mating contact (not shown but similar in arrangement to contacts 125 and 126, Fig. 18) and thence over lead 9 to the receiver circuit Fig. 27, where it is superimposed on the receivers. Return tone current to oscillator OSC3 is over lead 8.

INSTRUMENT FLIGHT TRAINING CIRCUIT

Referring to Figs. 25 to 31 inclusive, all apparatus included within the broken lines F, Fig. 25 (with the exception of the ball bank indicator BI) is mounted on the frame 12, Fig. 2. All apparatus included within the broken lines G and the lines D, and in addition the BI indicator, Fig. 25, the attenuators ATT1 and ATT2, the key SIG, the lamps, Fig. 28, the telephone circuit, Fig. 27, the power source, Fig. 30, and the coin control circuit, Fig. 31, are mounted at the traversing table 8, Fig. 2. All other apparatus is mounted in a relay cabinet, not shown. Connections therefrom to the table 8 and frame 12 is by cabling.

Referring to Figs. 1 and 2, the airspeed motor ASM mounted beneath the traversing table 8 operates the airspeed meter 1, Fig. 3, to give an indication representing the forward speed of the course charting head 14 which charts the flight path of the pseudo-aircraft under control of the stick 10, the rudder 11, the throttle 13 and the stabilizer 60. Meter 1 is a tachometer of any form. The preferred form of tachometer is the revolving magnet type commonly employed for automobile speedometers. It is driven by the ASM motor shaft extension 47, the driving pulley 48, belt 49, Fig. 2 and Fig. 5 and driven pulley 50.

Referring to Fig. 25, power is applied to the motor ASM from the source Fig. 30 to lead 132 at the rheostat P13 which is mounted on the shaft 37 driven by the airspeed control motor ASCM through a high ratio reduction gear 38. From P13 connection is through rheostat P10 over lead 39. P10 is mounted on shaft 40 driven by the steering control motor SCM through the high reduction gear 41. From P10 connection is through rheostat P3 over lead 42. P3 is operated by the rudder bar 11 through gearing 43, Fig. 2 and Fig. 6.

From P3 connection is through rheostat P8 operated from the control stick 10 through the elevator gearing 44, Fig. 9 and Fig. 7. P8 introduces resistance in the circuit only when back pressure is applied to the elevator. This provides a small reduction in airspeed immediately when a climb is started as in actual aircraft. From P8 connection is through rheostat P2 which is hand operated through average airspeed dial P2, Fig. 1, and regulates the speed at which the ASM motor rotates with all controls in their normal position as shown in the circuit diagram, Fig. 25. From P2 connection is to the throttle rheostat P1 actuated by the throttle control 13, Figs. 1 and 2, through the rack 45, Fig. 2. From P1, connection is to the ASM airspeed motor over lead 133. The power connection is completed from the ASM motor to the source, Fig. 30, over the lead 134 on closure of the ASL relay. Inasmuch as rheostats P1, P2, P8, P3, P10, and P13, are each in series with the other and with the ASM motor, a change in adjustment of any one will vary the speed of the motor ASM and the airspeed indicator 1, Fig. 1, and also the speed of the course charting head 14. During straight and level flight, these rheostats are in the normal positions shown in Fig. 25, and the ASL relay is operated by power supplied from the source, Fig. 29, through contact 1 of relay LIM which is operated through the closed limit contacts LIMC1 and LIMC2, Fig. 27, Fig. 21, Fig. 22, and Fig. 23 which receive power from the source, Fig. 29, over lead 56 and lead 57.

The altimeter motor ALTM, which drives the rate of climb indicator 3, Fig. 3, and the altimeter 4, does not operate during straight and level flight as this is under control of the relay ALTL which is non-operated through the open ALTC contact 1, the shaft 37 of the assembly A, Fig. 25, being in the normal position as shown. Also the RA1 relay contact 3 and TC contact controlling the ALTL relay is open, the latter due to the cam 64 operated by the throttle 13, Fig. 1, being opened to cruising speed position. Likewise the steering motor SM which drives the rate of turn indicator 2, Fig. 1, and orients the course charting head 14, Fig. 1, is idle, the SML relay controlling this motor being non-operated through the open SMC contacts due to the shaft 40 and the SMC cam 67 being in normal position. The shaft 40, when operating, is driven through the reduction gearing 41 by the steering control motor SCM.

Having thus followed the circuit operation through one maneuver, it will be apparent how the circuits may be traced. Accordingly, all leads connecting to respective terminals of the main power source, Fig. 30, will be referred to as 110—1 and 110—2. Likewise all leads connecting to the respective terminals of auxiliary power source, Fig. 29, will be referred to as "battery" and "ground," these being shown on the drawings by the conventional symbols.

Climbs are performed by back pressure on the elevator control 10, Fig. 1, which rotates rheostat P8 to increase resistance in the ASM airspeed motor circuit causing some reduction in the indicated airspeed on meter 1, Fig. 3. The back elevator pressure also rotates the supporting frame 10a carrying the shaft 10b, Fig. 9, and the shaft 58 through gearing 44 thus rotating the slide 59 of rheostat P9. Contact 1 of the ACC spring assembly, Fig. 25, is closed by rotation of cam 61, Fig. 7, and Fig. 9, mounted on shaft 58 and on closure furnishes ground to the ASCL1 relay and through the closed T relay contact 5 and the closed AEC contact 1 to the ERL1 relay. Both of these relays operate by having battery standing on their windings through limit contacts ASLC and ERC1 respectively. The ASCL1 relay operated closes power to the air speed control motor ASCM through rheostat P9. Increasing back pressure on the stick 10 reduces the resistance inserted by P9 and increases the speed of rotation of the ASCM motor and hence the shaft 37 rotates faster. The shaft 37 rotates the cam 68, closing the ALTC contact 1 which operates the ALTL relay by competing its battery circuit to ground. The ALTL relay being operated, closes power to the altimeter motor ALTM which is under speed control through rheostat P14. Large angular rotation of shaft 37 due to fast or prolonged operation of the ASCM motor results in low resistance remaining in P14 and fast rotation of the altimeter motor ALTM which gives a high rate of climb indication on meter 3 and rapid altitude rise on meter 4.

Since shaft 37 is connected to motor ASCM by a high reduction gear 38 there is a time delay between operation of the control stick 10, Fig. 1, and the rotation of the shaft 37 to the position required to produce the desired response of the rate of climb meter 3 and the reduction in airspeed as shown by meter 1. Hence the use of the apparatus panel A has provided the time lag between control operation and aircraft response which characterizes real aircraft.

The ERL1 relay operated as above, operates the elevator restoring motor ERM which rotates the frame 137, Figs. 7 and 9, by means of the chain drive 136. Frame 137 carries the winding 69 of rheostat P9 and also the contact springs ACC and ERC1. Rotation of frame 137 is in a direction requiring the application of back elevator pressure to retain any desired amount of movement of the slider 59 with respect to the winding 69 and also to retain a given relation between the contact springs ACC and their operating cam 61, Fig. 8. Rotation of the motor ERM and the frame 137 continues until the ACC contact 1 opens due to rotation of the assembly around cam 61 by the ERM motor or until contacts 1 of the ERC1 limit assembly are opened by rotation of the ERC1 spring assembly around the fixed cam 139. The ERC1 contact 1 opened releases the ERL1 relay to stop the ERM motor. Contact 2 of the ERC1 assembly remains closed, however, to allow operation of the ERL2 relay on release of the back elevator pressure so that the motor ERM may then be operated in the reverse direction. It is to be seen from the foregoing that the effect of the ERM motor in displacing the ACC contact springs is to make the aircraft nose heavy and require continued application of some back elevator pressure to maintain the climb, as in actual flight condition. A constant climbing rate will be held when the back elevator pressure is such that the ACC contacts are all open. The stabilizer 60, which changes the tension on elevator spring 90, Figs. 1 and 7, may be used to maintain the desired elevator deflection.

Also operated by shaft 37, during back pressure on the elevator control 10 is the rheostat P13. The rotation of the ASCM motor to produce the climb has been in a direction to turn the shaft 37 counterclockwise and increase the resistance at P13. This reduces the speed of the airspeed motor ASM, the indication on the airspeed meter 1 and the rate of travel of the course charting head 14.

The steering motor SM and the steering control panel B has not operated during the maneuver.

Recovery from the climb is effected by relaxing the elevator which results in closure of the ACC contacts 2 and 3 and operation thereby of the ASCMR, ASCL2, ERR and ERL2 relays causing reversal of the ASCM and ERM motors respectively. Reversal of the ASCM motor drives the shaft 37 clockwise to tend restoration of rheostat P13 to normal and thereby to raise the ASM airspeed motor rotation to cruising value. This reversed operation of the ASCM motor continues only until the reversed operation of the ERM motor has rotated frame 137 back sufficiently to again open the ACC contacts which release the ASCMR, ASCL2, ERR and ERL2 relays stopping the ASCM and ERM motors. Rapid relaxation of the elevator control 10 displaces the ACC cam 61 sufficiently to allow the ASCM motor to operate a relatively long period, actually long enough to permit the shaft 37 to rotate clockwise enough for the ALTC contacts 2 and 4 to close before the ERM motor has opened the ACC contacts. The rate of climb meter 3 will then show a slight dive since the ALTMR and ALTL relays have been operated and have reversed the ALTM motor. The shaft 37 may then be returned to normal by applying slight back elevator pressure to close the ACC contact 1 and return the ASCM motor to counterclockwise rotation until zero rate of climb is obtained, which occurs when the ALTC contacts are all open due to the cam 68 being in neutral position.

The maneuver of diving is accomplished by forward pressure on the elevator control 10. This closes the ACC contacts 2 and 3, operating the ASCMR, ASCL2, ERR and ERL2 relays which respectively operate the ASCM and ERM motors in the manner as described above. The ASCM motor being operated, rotates the shaft 37 clockwise, reduces resistance from rheostat P13 in the ASM airspeed motor circuit causing the airspeed indicator 1, and the course charting head 14 to also have higher response. The shaft 37 rotating cam 68 closes the ALTC contacts 2 and 3 to furnish ground for operation of the ALTMR and ALTL relays, which being closed, operate the ALTM motor in series with rheostat P14 to drive the rate of climb meter and altimeter in a direction showing altitude loss. The speed of the altimeter motor ALTM and the airspeed motor ASM depend on the position of the sliders of rheostats P14 and P13 respectively. These slider positions depend in turn on the displacement of shaft 37 which is determined by the speed and length of operation of the ASCM motor. Large deflection of the elevator control 10 reduces the resistance P9 in the ASCM motor circuit, causing it to rotate shaft 37 through a large angle in relatively short time. Obviously, the same deflection of shaft 37 (and hence the same dive) may be obtained by smaller deflection of control 10 with less removal of P9 resistance if this degree of control is held for a longer time.

The ERM motor being operated, rotates frame 137 and thereby the ACC contact springs in the direction requiring sustained forward elevator pressure to prevent the ACC contact 1 operating and through relays ASCL1 and ERL1 operating the ASCM and ERM motors in a direction to respectively restore shaft 37 to neutral and cam 61 to normal. Excessive forward pressure on control 10 maintains contacts 2 and 3 closed, which by operation of the ASCMR and ASCL2 relays keep the ASCM motor running clockwise with the aircraft performing an outside loop as described under "Loops."

Recovery from the dive is by relaxation of forward pressure or the exertion of back pressure to hasten the pull out. The ACC contact 1 closes to operate the ASCL1 relay operating the ASCM motor counterclockwise through the P9 rheostat and thereby reducing the current to the air speed motor ASM through P13 and slowing the altimeter motor through increased resistance in P14. As the ASCM motor continues counterclockwise rotation, the ALTC contact 1 closes, operating the ALTL relay and the altimeter motor ALTM to show altitude gain.

An inside loop may be performed by continuing greater back pressure on the elevator 10 than is required to maintain a climb. Initially the back pressure will result in closure of the ACC contact 1, operation of the ASCM and ERM motors as described above for climbs. After an interval of operation, the ERM motor will have rotated the frame 137 which carries the ERC1 contacts until they have revolved about the fixed cam 139 sufficiently to open the ERC1 contact 1 which removes battery from the winding of relay ERL1, releasing the ERL1 relay and stopping the ERM motor. Thereafter, only constant or additional back pressure on the elevator control 10 will retain the ACC contact 1 closed and the ASCL1 relay operated which will continue operation of the ASCM motor. Shaft 37 will thereby continue rotating in a counterclockwise direction and until it has over-travelled 180° of such rotation, the rheostat P13 will continue to introduce additional resistance in the ASM motor circuit causing a reduction in indicated airspeed on meter 1, and the closed ALTC contact 1 will operate the altimeter motor ALTM to show increasing altitude. Subsequent to passing 180° of rotation, shaft 37 will have rotated cam 68 to close the ALTC contacts 2 and 3 which operate the ALTMR and ALTL relays to reverse the direction of the altimeter motor ALTM, causing it to show decreasing altitude. This reversal point is the top of the loop. Also, after passing the 180° point, the airspeed motor ASM will again receive power and show increased airspeed which is the dive after rounding the top of the loop. The limit contacts ASLC while operated by cam 140 during this complete rotation of shaft 37 will not have released the ASCL1 relay to stop the ASCM motor, as this relay continued to receive battery from the break contacts 63 of the unoperated ER relay.

Recovery from the inside loop to normal flight is similar to the recovery from climbs described above.

Outside loops may be performed by continued forward pressure on the elevator control, the circuit operation being complementary to that described for inside loops.

Stalls, like an inside loop are performed by continued back elevator pressure. Whether a stall or a loop has been performed is judged by the rate of back elevator application.

A normal glide is assumed by closing the throttle 13 which operates cam 64 to close the TC contact and operates rheostat P1 to insert resistance in the circuit of the airspeed motor ASM, thereby lowering the indicated speed on meter 1 and reducing the rate of travel of the course charting head 14. The TC contact, when closed, supplies ground to operate the T relay and thereby the ERL1 relay which starts the elevator restoring motor ERM, which through chain 136, Fig. 7, rotates the frame 137 to make necessary the continued application of back pressure on the elevator control 10. The T relay contacts 1 and 3 furnish ground to the ALTMR and ALTL relays, which being operated, start the altimeter motor ALTM in the direction which drives the rate of climb and altitude meters to show altitude loss. T relay contact 4 supplies ground for operating the ERX relay, which prevents operation of the ERR and ERL2 relays and consequent reversal of the ERM motor with any relaxation or forward pressure on the elevator control 10.

As in climbs, when the ERM motor has shifted the contact springs ACC after initial operation of the ERL1 relay, it is necessary to hold sufficient back pressure to avoid closure of the ACC contacts 2 and 3 if it is desired to hold the airspeed motor ASM at constant speed. Otherwise, closure of these contacts will operate the ASCMR and ASCL2 relays to start the airspeed control motor ASCM in the diving direction, rotating shaft 37 and rheostats P13 and P14 clockwise to a decreased resistance setting, which speeds up the ASM and ALTM motors respectively to show higher airspeed on meter 1 and faster altitude loss on meters 3 and 4.

Excessive back pressure will cause the ACC contact 1 to operate and close the ERL1 relay through T relay contact 5 and AEC contact 1 until the ERM motor has rotated the frame 137 and limit contacts ERC1 so as to open ERC1 contact 1, interrupting battery to the ERL1 relay, releasing that relay and stopping the ERM motor. During this operation, and as long as sufficient back pressure is used to continue the ACC contact 1 closed, the ASCL1 relay will be operated and allow the ASCM motor and shaft 37 to rotate in the climbing or counter-clockwise direction, adding resistance to the airspeed motor ASM at P13 and to the altimeter motor ALTM at P12, causing a reduction respectively in airspeed at meter 1 and in rate of climb and altitude at meters 3 and 4. Prolonged operation of shaft 37 results in a "power-off" stall with the same circuit operation as in the case of power stalls described above.

Any desired rate of descent in the glide may be held by adjusting the back elevator pressure to keep the ACC contacts open.

Recovery from the glide or power-off stall is effected by opening the throttle 13 to open the TC contact removing ground from the T relay which releases and thereby opens ground to the ERL1, ALTMR, ALTL and ERX relays. Opening the throttle also operates rheostat P1 to reduce its effective resistance and thereby to partially return speed to the ASM motor and airspeed meter 1. To level off in recovery, the elevator pressure is relaxed and the return to level flight is as described under recovery from "climbs" above.

Maneuvers subsequently to be described involve use of the aileron controls 10 and the rudder control 11. Deflection of the aileron control 10 rotates gears 141 and 142, Figs. 7 and 9, to operate rheostat P7 and cam 143 associated with contacts SKC2. Deflection of the aileron also rotates shaft 22, pulley 155, belt 145, the driven pulley 146, the shaft 147 and the gear 148 of the differential box 149. Deflection of the rudder rotates gears 150, 151 and 152, Fig. 6, which in turn operate rheostat P3 and P4 and cam 153 associated with contacts SKC1. The rudder bar 11 also rotates shaft 156, Fig. 2, pulley 157, belt 158, driven pulley 159, Fig. 6, shaft 160 and gear 161 of the differential box 149. Attached to the gear 162, differentially driven by gears 148 and 161 is rheostat P5 and contact assembly SCC. The belts 145 and 158 are so arranged that like movement of the aileron and rudder controls causes opposite rotation of gears 148 and 161 and therefore rotation of gear 162 to which is connected the slider of rheostat P5 and the cam 162' of the contact assembly SCC. Equal and opposite deflection of the aileron and rudder controls causes no rotation of gear 162.

Side slipping with aileron and opposite rudder control application closes the SKC1 and SKC2 contacts in opposite directions thereby placing battery and ground across the SK relay. The SK relay operating transfer speed control of the steering motor SM directly to the differentially geared rheostat P5 by closure of the SK relay contact 1. The circuit to the steering motor is completed through the SML line relay contact 1 which is operated by the SK relay.

Operation of the SML relay places the speed of the steering motor SM directly under control of rheostat P5 which, when not deflected by rotation of the differential gear 162, introduces sufficient resistance in the SM motor circuit so that this motor will not operate. The adjustment is such, however, that any small displacement of the slider of rheostat P5 decreases the resistance enough to start this motor. Thereafter the speed of the motor SM is proportional to the rotation of gear 162 which moves the slider of P5.

Operation of the SK relay places the steering motor reversing relay SMR under control of the SCC contact 2 through SK relay contact 4. With rudder and aileron deflections such that SCC contact 2 is operated, which occurs whenever both controls are deflected to the left or one control is deflected to the left by an amount more than the other is deflected to the right, the steering motor reversing relay SMR will operate causing the steering motor to show a left turn. The purpose of transferring control of the steering motor from the steering control panel B to the rheostat P5 and contacts SCC directly is to more nearly simulate the rapid response of actual aircraft to these controls when they are oppositely applied. The steering motor SM will be idle when the rudder and aileron are deflected equally in opposite directions because such movement of the controls 10 and 11 causes equal rotation of the gears 148 and 161 in the differential and therefore no rotation of gear 162 and no deflection of the rheostat arm from its central position. The aircraft will fly in a straight course with such equality of opposite control. However, the operated SK relay contact 3 operates the ER relay and through ER contacts 2 and 1, operates the T and ALTPR relays, respectively.

The effect of operation of the ALTPR relay is to reverse the connections of rheostat P14 to shift the power supply leads 110—2 to the opposite ends of the winding of P14 thereby causing less rapid rotation of the ALTM motor with increasing rotation of shaft 37 upon operation of the ASCM motor. The ALTM motor driving the rate of climb and altimeter thereby causes these instruments to show altitude loss at a decreasing rate as back elevator pressure is applied.

Operation of the T relay contacts 1 and 3 operates the ALTMR and ALTL relays, respectively, and thereby the altimeter motor ALTM in a direction to show decreasing altitude. The T relay contact 2 operates the ERL1 relay but does not operate the ASCL1 relay due to the circuit to the ASCL1 relay through the AEC contacts being broken at the T relay contact 5. The T relay contact 4 operates the ERX relay to prevent operation of the ERL2 and ERR relays and operation of the ERM motor to a forward elevator position.

The ERL1 relay being operated causes the ERM motor to rotate the frame 137 and the winding of P9 and the ACC contacts in the direction requiring back elevator pressure to hold constant airspeed. If back pressure is not held, the ASCM motor will operate by closure of the ACC contacts 2 and 3 and the ASCM motor energized will rotate shaft 37 and thereby the sliders of rheostats P13 and P14 to respectively vary the speeds of the airspeed motor ASM and the altimeter motor ALTM.

Overtravel of the ERM motor is prevented by opening of the ERC1 limit switch contact 1 which releases the ERL1 relay and stops the ERM motor.

The lower break contacts of the operated ER relay are open, hence the ASLC contacts have control of the ASCL1 and ASCL2 relays and prevent over-travel of shaft 37 beyond approximately 180° rotation.

Deflection of the rudder bar displaces the arm of potentiometer P4 with respect to the arm of potentiometer P7 by the degree of the side slip. This places potential across the ball indicator B1 which is so polarized as to throw the ball outward.

Recovery from the side slip is by neutralization of the rudder and aileron. The SK relay releases when the SKC1 and SKC2 contacts open. The SK relay being released releases the ER relay. The ball indicator returns to neutral as the arms of the potentiometers P4 and P7 are restored to parallel positions.

The ER relay released releases the T relay which releases the ERX and ERL1, ALTMR and ALTL relays. The ERX and ERL1 relays being released allow relaxation of the elevator by returning control of the ERR and ERL2 relays and thereby ERM motor to the ACC contacts. The ER relay in releasing also releases the ALTPR relay, causing restoration of the winding connections of potentiometer P14 to normal. The SK relay being released returns control of the SML relay to the SMC contacts.

Turns by use of the aileron and rudder jointly have the following circuit operation. A left turn is used as an example in the description.

Application of left aileron and left rudder result in a smooth entry to a banked turn when the two controls are coordinated to maintain the ball indicator, BI Fig. 25 (also shown at meter 2, Fig. 3) in its undeflected (or center) position. This occurs when the rudder and aileron deflections displace the slides of the potentiometers P4 and P7 so that they are at equipotential points. Excessive rudder causes the potential of the P4 slide to exceed that of the P7 slide and the ball indicator BI swings to the outside of the turn indicating the skid. Insufficient rudder causes excessive potential at the P7 potentiometer slide and the ball swings to the inside of the turn indicating a slip. The SCC contact 1 closes and operates the SCML1 relay (a right turn closes the SCC contact 2 which operates the SCML2 and SCMR relays) which in turn places power on the steering control motor SCM which drives shaft 40 through the reduction gearing 41. Inasmuch as the ratio of reduction of the gearing 41 is high, there is an appreciable time delay between operation of the rudder and aileron controls and the rotation of shaft 40 to its final position. Since, as will be seen, the final position of shaft 40 determines the rate of turning of the pseudo-aircraft, its delayed response to the controls simulates the delayed response of actual aircraft to control manipulation. Moreover, the final position of shaft 40 is dependent on the length of time that the aileron and rudder controls are operated as well as on the amount of their deflection. This integrated response also is a characteristic of actual aircraft. Hence steering control panel shown within the dotted lines B, Fig. 25, is a feature of my invention which enables me to reproduce the response of actual aircraft to stick and rudder movement.

The rate of rotation of the SCM motor and shaft 40 is dependent on the amount of resistance introduced by rheostat P5. Inasmuch as the resistance of P5 is decreased in proportion to the movement of the rudder or aileron control from neutral, a large deflection of these controls will cause fast rotation of shaft 40 and rapid entry into a turn. Left rotation of shaft 40 causes closure of the SMC contact 1 and operation of the SML relay which, when operated, places power on the steering motor SM, Figs. 25, 1, 4, and 5. The speed of the steering motor SM is dependent on the effective resistance of rheostat P11 which decreases as the slider of P11 is displaced from the normal position by shaft 40. The SM motor operates the rate of turn meter 2, Fig. 4, and through the gearing 63, shaft 61 and other means previously described, rotates the course charting head 14, Fig. 1. After acquiring the desired turning rate, the aileron and rudder are relaxed to open the SCC contacts which release the SCML1 relay and stop the SM motor. In its simulated flight the aircraft continues turning at the speed established by the position of the slide of rheostat P11. This persistence of turning, after control pressure release, is another characteristic of actual aircraft and its duplication in my apparatus is another feature of the steering control panel B.

Rotation from normal of the shaft 40 by an angle sufficient to produce a medium rate of turning causes cam 144 to release the AEC swing spring from contact 1 and close to contact 2, thereby disconnecting the ASCL1 relay from the ERL1 relay and operating the ERL1 relay from ground furnished at the AEC contact 2. The ERL1 relay operating causes the elevator restoring motor ERM to rotate in a direction making it necessary to hold back pressure on the elevator to prevent ACC contacts 2 and 3 from closing due to rotation of frame 137 and cam 138 by the ERM motor. This necessity for holding back elevator pressure during medium and steeper turns is introduced to simulate a like condition existing in actual aircraft. Closure of ACC contact 2 would as previously described, operate the ASCMR and ASCL2 relays and in turn the airspeed motor in a clockwise or diving direction. Overtravel of frame 137 is prevented by the ERC1 limit contacts which control battery to the ERL1 relay as previously described under circuit operation during climbs and during side slips.

Rheostat P3 has also been rotated off-normal by operation of the rudder, thereby inserting resistance in the airspeed motor circuit ASM to reduce its speed and cause meter 1 to show lower air speed as in actual aircraft during turns.

It is clear that separate use of the rudder or aileron alone results in similar circuit operation. Any opposite control movement such as left rudder and right aileron results in the circuit operation described for side slips above.

The SML relay is operated while the steering motor SM rotates. Hence, a break contact 2 on this relay is used to open the circuit to the lamp L1, Fig. 28, in the compass 5, Fig. 3, while the SM motor is in operation. Inasmuch as the compass can only be used while illuminated from the rear of its face, the opening of the lamp circuit during turns simulates the inability to read a magnetic compass during rotation of the aircraft. If the compass is to be used as a gyro instrument, the break contacts of the SML relay may be by-passed by operating the switch GS, Fig. 28, to the "gyro" position.

Recovery from the turn or reduction in turning rate is obtained by application of reverse aileron and rudder which, with recovery to the right, causes closure of the SCC contact 2 and operation of the SCML2 and SCMR relays which rotate the SCM motor clockwise until again stopped by neutralization of the aileron and rudder. If these controls are neutralized at the time the SCM motor has returned to neutral from its left deflection, no further adjustment of the ailerons or rudder will be required and the turn will have stopped.

The elevator is also relaxed during recovery which closes the ACC contacts 2 and 3 to operate the ASCMR and ASCL2 relays to rotate the ASCM motor clockwise and restore rheostat P13 and thereby the speed of the airspeed motor ASM. The ERR and ERL2 relays also operate with closure of the ACC contacts 2 and 3 and hence the ERM motor follows the forward movement of the elevator control 10 until the ACC contacts open or the limit switch ERC1 contact 2 opens. With return of the steering control panel shaft 40 to within a nominal angle from normal, the AEC contact 1 will be re-made and contact 2 opened, thereby restoring control of the ASCL1 and ERL1 relays to the ACC contacts and allowing the elevator restoring motor to follow the elevator control in a backward direction as well as forward.

Tail spins are entered either with the throttle operated or closed by applying full back elevator pressure and rudder in the desired direction of spin. The ball bank indicator BI (meter 2, Fig. 3) will swing outward in the spin direction due to potential from the slide of potentiometer P4. The full back elevator pressure closes the SC contact operated by cam 170 attached to shaft 58. The SC contact 3 supplies ground to operate the ER relay which, when operated, operates the T and ALTPR relays with resultant circuit operation as described for these relays under side slips and turns above. The ER contacts 63 being open remove battery from this point to the ASCL1 and ASCL2 relays and thereby make the ASLC contacts effective in opening battery to the ASCL1 and ASCL2 relays. Accordingly, shaft 37 of the airspeed control panel A, cannot travel beyond approximately 180° of rotation as cam 140 will operate the ASLC limit contact 1 or 2 releasing the ASCL1 or ASCL2 relay respectively. Hence continued back pressure on the elevator and resultant continued closure of the ACC contact 1 will operate the ASCL1 relay and thereby the ASCM motor but only until shaft 37 has operated the ASLC limit contact 1 and released the ASCL1 relay. Thereafter shaft 37 will remain in full deflected position and rheostat P13 will have a maximum resistance setting which reduces the speed of the airspeed motor ASM and the airspeed indication on meter 1. Likewise, the slider of rheostat P14 is at its full deflected position and due to the operation of the ALTPR relay, supplies full power to the altimeter motor ALTM which operates at top speed and thereby shows a high rate of descent on meters 3 and 4. The steering motor SM will also operate at top speed showing a high rate of turning on meter 2, because the rudder being held at full deflection closes the SCC contact 1 or 2, depending on the direction of rudder application, and thereby operates either the SCML1 relay or both the SCML2 and the SCMR relays respectively, which starts the steering control motor SCM under control of rheostat P5. The full rudder application deflects rheostat P5 to reduce its resistance and give fast operation to the SCM motor which rotates shaft 40 until the SCML1 or SCML2 relays are released by operation of the SCMLC limit contacts which leave shaft 40 in full deflected position and hence the slider of rheostat P11 at the end of its winding. This position of P11 places full potential on the steering motor SM. The shaft 40 also operates rheostat P10 to its end position and since this rheostat is in series with rheostat P13 and the airspeed motor ASM, the speed of the ASM motor is reduced and a low airspeed reading is obtained on meter 1. If the throttle 13 has been closed, still further resistance is added to the ASM motor circuit by rheostat P1 and its speed will be reduced to a value approaching stalling. As the T relay has been operated by ground from the ER relay contact 2, no circuit change other than the addition of P1 resistance occurs on operation of the throttle inasmuch as the TC contact also sends ground to the T relay.

Recovery from the spin is accomplished by relaxation of the elevator and the application of opposite rudder. Forward elevator operates cam 170 to contact SC and thereby the ER relay which releases the ALTPR relay restoring the position of the power connections to rheostat P14 and thereby reducing the speed of the altimeter motor ALTM and the descent rate on meters 3 and 4. The forward elevator pressure closes ACC contacts 2 and 3 operating the ASCL2 and ASCMR relays to reverse the ASCM motor and shaft 37 causing its operation to restore the airspeed by reducing resistance in rheostat P13 and lowering the rate of descent by adding resistance in rheostat P14. The rudder reversed, causes reverse operation of the SCM motor and shaft 40 and further restoration of the airspeed by reducing resistance in P10. Also the speed of the steering motor SM is reduced as shaft 40 restores to normal due to insertion of resistance at rheostat P11. If the rudder is neutralized when shaft 40 has returned to normal, the pseudo-aircraft will be in straight flight. If the throttle was closed during the maneuver and opened during recovery, the airspeed motor will increase in speed by removal of resistance from P1 and the relays ALTL and ALTMR will be restored permitting the altimeter motor ALTM to operate to show a climb. The ERL1 relay is also released by opening the throttle and the ERL2 and ERR relays can operate the ERM motor to return the frame 137 to normal or to an advanced position. Level flight is attained as in recovery from dives as described above.

Rough air is simulated by periodic closure of the relays RA1 and RA2, Fig. 25, by the contacts RA operated from a cam driven by the interrupter motor INTM, Fig. 26. Connection from the RA contacts to the RA1 and RA2 relays is over lead 154, Figs. 25 and 26 and through the RAS1 and RAS2 switches located at the instructor's and student's positions respectively. When either the RAS1 or RAS2 switch is operated the RA contact intermittently furnishes ground to the RA1 and RA2 relays. The RA1 relay in operating operates the ASCL2 and ASCL1 relays thereby preparing the ASCM motor for operation in either the reverse or forward direction depending on whether the ASCMR relay has been operated or released as the result of circuit connections momentarily prevailing at the time. The RA1 relay also operates the ALTL, the SCML2 and SCMR relays which close the ALTL and SCM motors circuits, the SCM motor being prepared for reverse operation. In addition, the RA1 relay shifts the electrical center of potentiometer P4 thereby displacing the ball bank indicator BI of meter 2, Fig. 3.

Operation of the RA2 relay extends power to the circuits of the ALTM motor, the SCM motor, SM motor, the ASM motor, the ASCM motor and the solenoids 183 which deflect the frame 13. The resistances R3, R4, R5, R6 and R7 respectively, limit the speed and current of the above motors when their circuits are closed to the power source.

Provision of the automatic signal controller 16, Fig. 2, which is operated by movement of the pantograph 15 to change the radio range signals without manual attention and in exactly the manner in which they would change were the flight made on an actual range, eliminates the need of an attendant to the training apparatus and therefore uniquely adapts it to operation from a coin machine that closes power to the apparatus for a timed interval. A connection for this coin device is shown schematically in Fig. 31.

Modified schematic diagram, Fig. 32 is a circuit in which a polar relay PR is employed for operating the SCMR and SMR relays (the latter relay through the lower contacts of relay SK) instead of the SCC contacts operated by the differentially geared cam 162' of Fig. 25. This PR relay has two windings $a$ and $b$ which are connected respectively to potentiometers P4 and P7 which are operated directly by the rudder and aileron controls, Figs. 6 and 7. One end of each PR relay winding is connected to a common terminal 174, Fig. 32, which connects to the center of the P4 and P7 windings as shown at 175 and 176 respectively, Fig. 32. The other ends of the windings are terminated at the sliders of windings P7 and P4. The windings are so polarized that if the difference in potential across the windings is negative, the relay operates, whereas if this potential difference is zero or positive, the relay is unoperated.

Another modification comprises the use of two rheostats P15 and P6 each separately operated by the rudder and aileron respectively and shown dotted in Figs. 2 and 7 respectively. These separately or conjointly modify the resistance in the power circuit of the SCM motor to control its speed.

SCC1 and SCC2 contacts are provided by Fig. 32 for controlling operation of the SCML1 and SCML2 relays. These contacts are operated by the rudder and aileron respectively and are employed instead of the differentially operated SCC contact of Fig. 25.

A modified motor circuit is shown in Fig. 24 and utilizes the well-known "three-wire" motor to replace the reversible motor used, for example, in the ASCM, SCM or ERM positions of Figs. 25 and 32. The advantage of the three-wire motor is elimination of reversing relays such as the ASCMR, the SCMR and the ERR relays of Figs. 25 and 32. It is necessary only to energize the three-wire motor 181 through winding 182 or winding 183 of the control rheostat P16.

I claim:

1. A stationary trainer device for teaching a student in flying radio beam patterns, said device comprising a simulated compass visible to the student, a tracing unit remote from the student, said unit having chart marking means and means for propelling the tracing unit on a chart including a layout of a radio beam pattern thereon at an assumed forward speed of said trainer device, control means operable at the will of the student for changing the heading of said tracing unit on the chart, means coupling said simulated compass to said tracing unit for changing the heading of said compass in accordance with changes in heading of said tracing unit for indicating to the student simulated changes in heading of said trainer device, means operable for transmitting to the student signals simulating radio signals broadcast to an aeroplane in actual flight, said signals being transmitted in accordance with the heading and position of said tracing unit on said chart, and means for varying the intensity of such signals.

2. A stationary trainer device for teaching a student in flying radio beam patterns, said device comprising control means operable by said student, a simulated compass visible to the student, a tracing unit remote from the student, said unit having chart marking means and propelling means therefor, a chart on which said tracing unit is adapted to be moved, said chart including a layout of a radio beam pattern thereon, driving means coupled to said propelling means to move said tracing unit on said chart at an assumed forward speed of said trainer, means operable when said control means is in a neutral position to effect straight line movement of said tracing unit on said chart, means operable when and for as long as said control means is shifted from its neutral position to a first selected position for continuously changing the heading of said tracing unit in one direction of rotation, means operable when and for as long as said control means is shifted from its neutral position to a second selected position for continuously changing the heading of said tracing unit in the other direction of rotation, means coupling said simulated compass to said tracing unit for changing the heading of said compass in accordance with changes in heading of said tracing unit for indicating to the student a simulated heading of said trainer, means for transmitting to the student signals simulating radio signals broadcast to an aeroplane in actual flight, said signals being transmitted in accordance with the observed heading and position of said tracing unit on said chart, and means for varying the intensity of such signals.

3. In a coordinator of the character described, in combination, an electrically energized bank indicator simulator having a movable indicator element, means for causing the application of variable electric forces to said indicator to effect typical movements of the indicator element of varying degree and direction, movable right and left foot controls adapted to be selectively actuated by the user's feet, a hand control adapted to be actuated to right or left by the user's hands, and means operable under the conjoint control of the said hand and foot controls for producing counteracting electrical influences in the bank indicator simulator, variable in direction and extent in accordance with the selection of controls and extent of their movement, and whereby the indicator moving forces may be nullified.

4. A coordinator of the character described comprising in combination, an electrically energized bank indicator simulator having an indicator element movable from a neutral indication to right or left according to direction of flow of current and potential on its terminals, selectively operable right and left foot controls, a hand control lever selectively movable from neutral position to right and left sides, an electrical resistance element associated with the hand control, a source of electrical energy with connections from its positive and negative poles to the opposite ends of each of the resistance elements, a contactor for each resistance element, means electrically connecting the contactors respectively with the terminals of the bank indicator, means for causing relative movement of one of the contactors along its resistance, and means operable by movements of said hand and foot controls to right or left to adjust the contactors along the resistance elements corresponding thereto accordingly to effect the neutralization of forces in the indicator.

5. A stationary coordinator trainer for airplane flight training comprising a cockpit frame, hand and foot control devices, and a turn and bank indicator element simulating parts of an airplane; an auxiliary means operable to cause typical flight movements of the turn and bank indicator element, and means associated with the said auxiliary means and operable by the hand and foot control devices to counteract the movement producing action on the indicator element of the said auxiliary means.

6. Training apparatus for simulating the flight of an aircraft with respect to a radio station, an electrical circuit comprising variable electrical means under control of a trainee, a source of signals adapted to simulate the signals of said radio station, a receiver for said signals, means for attenuating said signals, a movable device, motive means responsive to said electrical circuit for moving said device in accordance with the instant simulated position of said aircraft with respect to said simulated radio station, said device being operatively connected to said attenuating means for varying the received signals in accordance with the simulated position of said aircraft, means for independently adjusting by bodily lateral movement the position of said attenuating means to introduce the effects of wind drift or beam irregularities, and means for also rotating said attenuating means to change the direction of wind drift.

7. In apparatus for simulating the flight of an aircraft, a simulated aircraft for ground training control, means associated with the control for deriving a voltage varying in accordance with movement of that control, a flight indicating instrument responsive to the voltage and electromechanical means for delaying the response of the instrument to cause the instrument to react to the operation of the control in a manner simulating the reaction of a similar instrument in an actual aircraft.

8. Flight-simulating apparatus for ground training for indicating and controlling a flight maneuver, a plurality of simulated aircraft flight controls operable to simulate the operation of the controls of an actual aircraft being maneuvered on a course, means associated with each control for deriving a respective voltage varying in accordance with the movement of that control, two moving elements each responsive to at least one of the derived voltages and course indicating means operated in accordance with the motion of the two moving elements to show the position of the aircraft on its course.

9. Flight-simulating apparatus for ground training for indicating and controlling one or more simulated flight conditions comprising a plurality of simulated controls for the said one or more conditions, means associated with each control for deriving a respective voltage varying in accordance with movement of that control, an electric circuit jointly responsive to all the derived voltages, a motor and a first simulated flight-indicating instrument responsive to the electrical circuit and a second simulated flight-indicating instrument responsive to the motor, said instruments conjointly indicating one or more of the said flight conditions.

10. A stationary trainer device for teaching a student in flying radio beam patterns, said device comprising a simulated compass visible to the student, a tracing unit remote from the student, said unit having chart marking means and means for propelling the tracing unit on a chart including a layout of a radio beam pattern thereon at an assumed forward speed of said trainer device, control means operable at will of the student for changing the heading of said tracing unit on the chart, means coupling said simulated compass to said tracing unit for changing the reading of said compass in accordance with changes in heading of said tracing unit for indicating to the student simulated changes in heading of said trainer device, and means operable for transmitting to the student signals simulating radio signals broadcast to an aeroplane in actual flight.

11. In an aircraft training apparatus for ground training for indicating and controlling one or more simulated flight conditions, the combination of a plurality of manually operable control members corresponding to those of an actual aircraft operable conjointly to produce said conditions, an electrical motor, a flight condition indicator operably responsive to said motor, a plurality of variable electrical devices for controlling the operation of said motor, certain of said variable electrical devices being operatively connected respectively to certain of said manually operable flight control members for individually adjusting said variable electrical devices, a servo-motor operably responsive to at least one of said flight control members, and an operative connection between said servo-motor and at least one of said variable electrical devices for adjustably operating the same.

12. In an aircraft training apparatus for ground training for indicating and controlling one or more simulated flight conditions, the combination of a plurality of manually operable control members corresponding to those of an actual aircraft operable conjointly to produce said conditions, an electrical motor, a flight condition indicator operably responsive to said motor, a plurality of variable electrical devices for controlling the operation of said motor, certain of said variable electrical devices being operatively connected respectively to certain of said flight control members for individually adjusting said variable electrical devices, a servo-motor operably responsive to at least one of said flight control members, and an operative connection including a drive gear reduction between said servo-motor and at least one of said variable electrical devices for adjustably operating the same to thereby provide for time delay between the operation of said control members and said indicator.

13. In an aircraft training apparatus for ground training for indicating and controlling one or more simulated flight conditions, the combination of a plurality of manually operable control members corresponding to those of an actual aircraft operable conjointly to produce said conditions, an electrical motor, a flight condition indicator operably responsive to said motor, a plurality of variable electrical devices for controlling the operation of said motor, certain of said variable electrical devices being operatively connected respectively to certain of said manually operable flight control members for individually adjusting said variable electrical devices, a plurality of servo-motors operably responsive respectively to a plurality of said flight control members, and operative connections between respective of said servo-motors and respective of other of said variable electrical devices for adjustably operating the same.

14. In an aircraft training apparatus for ground training for indicating and controlling one or more simulated flight conditions, the combination of a plurality of manually operable control members corresponding to those of an actual aircraft operable conjointly to produce said conditions, a rotatable electrically actuated inertia member, a flight condition indicator operatively connected to said rotatable member, a plurality of variable electrical devices for controlling the operation of said member, certain of said variable electrical devices being operatively connected respectively to manually operable flight control members for individually adjusting said variable electrical devices, whereby the rotation of said electrically actuated member is controlled in accordance with the conjoint manipulation of said control members and the operation of said indicator is delayed in accordance with the inertia of said rotatable member.

15. In aircraft training apparatus, the combination of means for producing at different simulated positions of azimuth and range a signal corresponding to the signal received at different positions on a radio range having a plurality of direction sectors, said means comprising a source of signal current designating one sector, a source of signal current designating another sector, a translating device associated with said sources and having a rotatable element movable to different angular positions representing azimuth for varying the relative intensities of said sector currents so as to correspond substantially to the relative intensities of the sector currents which would be normally received at those angular positions from the center of the radio range, means associated with said translating device for varying the positions of equal signal intensities corresponding to the angular positions of said sectors, electrical means representing radio stations positioned in radial alignment with said positions of equal signal intensities, means for maintaining alignment of said radio station representing means and the aforesaid equal intensity positions when said positions are shifted, an electrical device including an element individually movable to different range positions for varying the magnitude of said sector currents so as to correspond substantially to the relative magnitudes of the sector currents which would be normally received at those range positions from the center of the radio range, said individually movable element being arranged to coact with a respective station representing means when the position in azimuth of said movable element corresponds to one of said positions of equal signal intensity and when its range position corresponds to the range of one of said station representing means for causing typical radio station signals, and a receiver for the signal currents.

16. In aircraft training apparatus, the combination of means for producing at different simulated positions a signal corresponding to the signal received at different positions on a radio range having a plurality of direction sectors, said means comprising a source of signal current, a plurality of azimuth elements associated with said source for representing sectors of said radio range, means including a rotatable element movable to different angular positions with respect to said azimuth elements for varying the relative intensities of the signal currents so as to correspond substantially to the relative intensities of the signal currents which would be normally received at those angular positions from the center of the radio range, means associated with said azimuth elements for establishing positions of equal signal intensities corresponding to the angular positions of said sectors and for varying said positions, electrical means representing radio stations positioned in radial alignment with said positions, means for maintaining alignment of said radio station representing means and the aforesaid equal intensity positions when said positions are shifted, an electrical device including an element individually movable to different range positions for varying the magnitude of said sector currents so as to correspond substantially to the relative magnitudes of the sector currents which would be normally received at those range positions from the center of the radio range, said individually movable element being arranged to coact with a respective station representing means when the position in azimuth of said movable element corresponds to one of said positions of equal signal intensity and when its range position corresponds to the range of one of said station representing means for causing typical radio station signals, and a receiver for the signal currents.

17. In aircraft training apparatus for ground training, the combination of a station for accommodating a student, means for movably supporting said station from a relatively stationary base, controls operable by a student in said station for simulating aircraft maneuvers, control means for simulating rough air conditions, electro-mechanical means operatively related to said station and responsive to said control means for moving the same in simulation of rough air conditions, simulated flight instruments, electro-responsive means also responsive to said control means for affecting said instruments to simulate rough air conditions, and electrical means responsive to said controls for counteracting the rough air effect on said instruments.

18. In an aircraft flight simulating apparatus for ground training for indicating and controlling one or more simulated flight conditions, the combination of a plurality of simulated aircraft controls for the said one or more conditions, electrical means associated with each control for deriving a respective voltage varying in accordance with adjustment of that control, a flight indicating instrument actuated in accordance with the resultant of all of the voltages, electrical means for affecting said instrument to simulate rough air conditions, and means responsive to said controls for controlling the simulated conditions thus created.

19. In an aircraft training apparatus for ground training for indicating and controlling one or more simulated flight conditions and indicating the path of simulated flight, the combination of an electro-mechanical translating system including a plurality of electrical circuits each having variable electrical means, certain of said electrical circuits being electro-mechanically interconnected for modifying current characteristics of one of said circuits, a plurality of simulated flight controls each operating one or more of said variable electrical means, means for indicating said path of flight including a plurality of electromotive means operatively connected to respective of said circuits, signal producing means for simulating signals of a radio range, and control means for said signals operatively responsive to said circuits in synchronism with the operation of said electro-motive means to thereby control said signals in accordance with the said indicated flight path.

20. Flight simulating apparatus for ground training for indicating and controlling one or more simulated flight conditions, comprising a plurality of simulated controls for said flight, variable electrical means actuated by said controls, a galvanometer arranged to indicate a flight condition jointly responsive to said electrical means, and means for intermittently modifying the effect of said electrical means on said galvanometer to cause the galvanometer to deflect in simulation of a rough air condition.

21. In aircraft training apparatus for ground training having simulated flight controls, the combination of an electric circuit controlled by said flight controls, a motor operatively related to said circuit, a flight indicating instrument operatively connected to said motor, and means for intermittently varying the speed of said motor to cause variations in the deflection of the flight instrument to simulate rough air conditions encountered in actual flight.

22. Aircraft training apparatus for charting the course of a simulated flight with respect to a reference point comprising an extensible linkage pivotally movable with respect to said reference point and having a tractor wheel representing the instant flight position, a rotatable support for said wheel, means comprising simulated air speed control for driving said wheel according to simulated air speed of the aircraft, and means comprising simulated turning control for turning said support according to the simulated flight direction of the aircraft.

23. Aircraft training apparatus for charting the course of a simulated flight with respect to a reference point comprising a pantograph pivotally mounted at said reference point and having a tractor wheel representing the instant flight position, a rotatable support for said wheel, means comprising simulated air speed control including a motor for driving said wheel according to simulated air speed of the aircraft, and means comprising simulated turning control including a second motor for turning said support according to the simulated flight direction of the aircraft.

24. Aircraft training apparatus for ground training comprising a source of current, a pair of potential dividers in circuit therewith, a simulated stick control for adjusting one of said dividers, a simulated rudder control for adjusting the other of said dividers and an electrical device representing a ballbank indicator jointly responsive to potential from both said dividers.

25. Aircraft training apparatus for ground training comprising a simulated aircraft control, voltage deriving means responsive to the operation of said control, an electrical network associated with said voltage deriving means, an indicating meter representing an aircraft flight instrument controlled by said electrical network, and retarding means associated with said network and indicator for effecting a time delay between the operation of said control and the response of said indicator to simulate the delayed response of an aircraft to its controls in actual flight.

26. Aircraft training apparatus for ground training comprising a simulated aircraft control, potentiometer means responsive to the operation of said control, an electrical network including a source of current connected to said potentiometer means, an indicating meter representing an aircraft flight instrument controlled by said electrical network, and retarding means for effecting a time delay between the operation of said control and the response of said indicator to simulate the delayed response of an aircraft to its controls in actual flight.

27. In aircraft training apparatus for ground training, an orientator comprising a source of quadrant signal currents, a signal controlling device therefor comprising signal attenuating means, a rotatable shaft movable according to the simulated flight position in azimuth for adjusting said attenuating means, means movable to represent the instant flight position, a bar radially affixed to said shaft and having a slider connected to said movable means adapted to be displaced according to the radial distance from said shaft, a second signal attenuating means controlled by said slider for varying the aforesaid signal output, auxiliary means in addition to said movable means for rotating said shaft, and circuit controlling means responsive to relative movement between said slider and bar for controlling said auxiliary means so as to cause said bar to hunt said slider when said slider approaches the axis of said shaft.

28. In aircraft training apparatus for ground training, an orientator comprising a source of quadrant signal currents, a signal controlling device therefor comprising signal attenuating means, a rotatable shaft movable according to the simulated flight position in azimuth for adjusting said attenuating means such that the signal strength of the output of said means during 360° of rotation of said shaft varies in the same manner as the strength of the respective signals on an actual radio range as such range is encircled, means movable to represent the instant flight position, a bar radially affixed to said shaft and having a slider connected to said movable means adapted to be displaced longitudinally of said bar, a second signal attenuating means controlled by said slider for varying the aforesaid signal output in substantially the same manner as the signal strength varies with radial distance on an actual radio range, auxiliary means including a motor for rotating said shaft, and circuit contacts actuated by relative movement between said slider and bar for controlling said motor so as to cause said bar to hunt said slider when said slider approaches the axis of said shaft.

29. Aircraft training apparatus for ground training comprising a simulated elevator control, a simulated rudder control, voltage deriving means adjustable respectively by said controls, an electro-responsive means including a motor jointly controlled according to the adjustments of said voltage deriving means, an indicator representing an air speed meter, a second indicator representing a rate of climb meter, said rate of climb indicator being controlled by said motor and said air speed indicator being controlled by said electro-responsive means.

30. Aircraft training apparatus for ground training comprising a simulated aircraft control, electro-responsive means including voltage deriving means responsive to the operation of said control, an electric motor controlled by said electro-responsive means, a speed control device driven through reduction gearing by said motor, a second motor controlled by said speed device, and a tachometer representing a flight condition rate operated by said second motor.

31. Aircraft training apparatus for ground training comprising simulated aircraft controls, electro-responsive means including voltage deriving means jointly responsive to the operation of said controls, a motor responsive to the operation of said voltage deriving means and controlled by said electro-responsive means, an indicating instrument representing a rate of turn meter responsive to the operation of said motor, and an indicator representing a compass operated by said motor.

32. Aircraft training apparatus for ground training comprising a simulated aircraft control, electro-responsive means including potentiometer means responsive to the operation of said control, an electric motor controlled by said electro-responsive means, speed control means driven through reduction gearing by said motor, a second motor controlled by said speed control means, and an indicator representing a rate of change of a flight condition operated by said second motor.

33. Aircraft training apparatus for ground training comprising a simulated throttle control, simulated elevator, rudder and aileron controls, electro-responsive means including respective potentiometer means operable according to the individual manipulation of said controls, an indicator representing an air speed meter, and an electric motor controlled by said electro-responsive means according to the joint operation of said controls for actuating said air speed indicator.

34. Aircraft training apparatus for ground training comprising a simulated throttle control, simulated elevator, rudder and aileron controls, electro-responsive means including respective potentiometer means operable according to the individual manipulation of said controls, charting means for representing the flight path, and electric motive means controlled by said electro-responsive means according to the joint operation of said controls for controlling said charting means.

35. Aircraft training apparatus for ground training comprising an indicator representing rate of change of a flight condition, simulated aircraft controls operable by a student, an electro-mechanical network including voltage deriving means controlled by respective operation of said controls for actuating said indicator, retarding means included in said network for effecting a time delay between the operation of said controls and the response of said indicator to simulate the delayed response of an aircraft in actual flight and means also included in said network for continuing the actuation of said indicator subsequent to relaxation of said controls to simulate persistence of travel in maneuvers such as turns or dives.

36. In aircraft training apparatus for ground training, means for producing at different simulated flight positions a signal corresponding to the signal received at corresponding azimuth positions on a radio range having a plurality of direction sectors, said means comprising a pair of potentiometers for representing said sectors each energized from a source of signal current and having means movable to different angular positions for varying the relative intensities of respective signal currents so as to correspond substantially to the relative intensities of sector currents which would be normally received at those angular positions from the center of the radio range, means for electrically interconnecting said potentiometers at a plurality of points representing signal sector limits for fixing positions of equal signal intensities corresponding to the on-course beams defining the angular positions of said sectors, said interconnecting means being adjustable for varying the simulated beam pattern, and a receiver for the signal currents.

37. Flight simulating apparatus for ground operation for indicating and controlling one or more simulated flight conditions comprising a plurality of simulated flight controls for the said one or more conditions, a source of voltage, variable electrical means associated with each control and connected to said source for deriving a voltage having a parameter varying with the adjustment of that control, reversible electric power means operable according to combined parameters of said voltages, a flight indicating instrument for indicating one of said conditions, means for operating the instrument in accordance with the operation of the power means and electrical means for causing intermittent deflection of the instrument to simulate behavior in rough air.

38. Flight simulating apparatus for ground operation for indicating and controlling one or more simulated flight conditions such as air speed and altitude comprising simulated throttle and elevator controls, and electro-mechanical network including a source of voltage, a plurality of circuits energized from said source each including one or more voltage varying means, one of said voltage varying means being operated by said throttle control for controlling the respective circuit, servomotor mechanism responsive to the operation of said elevator control electro-mechanically interconnecting a pair of said circuits including the aforesaid throttle controlled circuit for modifying current characteristics of one of said circuits, and a pair of indicators calibrated respectively in terms of air speed and altitude responsive respectively to said interconnected circuits.

39. Flight simulating apparatus for ground operation for indicating and controlling one or more simulated flight conditions comprising a plurality of simulated flight controls, an electro-mechanical network including a source of voltage, a plurality of potentiometer means connected to said source and responsive to said controls respectively for deriving voltages having parameters corresponding to the adjustments of said controls and reversible motive means controlled in accordance with the combined parameters of the derived voltages and a flight indicating instrument calibrated in terms of one of said conditions responsive to operation of said motive means for indicating said condition.

40. Flight simulating apparatus for ground operation comprising simulated throttle and elevator controls, a plurality of variable voltage means operable respectively according to the individual manipulation of said controls for deriving control voltages, an indicator calibrated in terms of air speed, an electric motor controlled according to a combined effect of said voltages for actuating said air speed indicator, an electric servo system responsive to the operation of said elevator control for modifying the operation of said air speed motor and a second indicator calibrated in terms of rate of climb responsive to said servo system.

41. Flight simulating apparatus for ground operation for indicating and controlling a plurality of simulated flight conditions including altitude and rates of turn and climb, comprising a plurality of simulated flight controls for the said flight conditions, an electro-mechanical network including a source of voltage and variable electrical means energized from said source and associated with each control for deriving a voltage having a parameter varying in accordance with adjustment of that control, a plurality of flight indicating instruments calibrated to represent the aforesaid flight conditions respectively and means responsive to said voltage deriving means and actuated in accordance with combined parameters of the aforesaid voltages for positioning said instruments respectively, said responsive means including means interposed with respect to said voltage deriving means and said instruments for retarding the operation of said instruments for simulating characteristic flight response.

42. Flight simulating apparatus for ground operation comprising simulated flight controls, an electro-mechanical network including a source of voltage, a plurality of variable electrical means connected to said source and adjustable by said controls respectively for deriving voltages having parameters according to the movements of the respective controls, and motive means controlled according to the combined parameters of said voltages for representing change in a condition of the simulated flight, an indicator calibrated to indicate rate of change of said condition operatively connected to said motive means, an indicator calibrated to represent said condition, and means operatively interconnecting said motive means and said last-named condition indicator.

43. Flight simulating apparatus for ground operation comprising simulated stick and throttle controls, an electro-mechanical network including a source of voltage, a plurality of potentiometer means connected to said source and adjustable by said controls respectively for deriving voltages having parameters according to the movements of the respective controls, a motor operable according to the combined parameters of said voltages for representing change in a vertical condition of the simulated flight, an indicator calibrated to indicate simulated rate of climb operatively connected to said motor, an indicator calibrated to represent simulated altitude, and means operatively interconnecting said motor and said altitude indicator.

44. In flight simulating apparatus for ground operation for controlling and indicating one or more simulated flight conditions, the combination of a simulated flight control, an electro-mechanical network including a source of voltage, variable voltage means energized from said source and actuated by said control, an electric circuit including a servo motor responsive to the operation of said control for actuating a second variable voltage means, an electric motor, said first and second variable voltage means in combination controlling the operation of said electric motor and a flight indicating instrument responsive to said electric motor.

45. In flight simulating apparatus for ground operation for indicating and controlling one or more simulated flight conditions, the combination of simulated rudder and elevator controls, an electric servo motor mechanism responsive respectively to the operation of each control, a plurality of voltage varying means controlled by each servo mechanism, flight indicators calibrated to represent direction and altitude responsive to voltage varying means of said rudder and elevator controlled servo mechanisms respectively, and an indicator calibrated in terms of airspeed responsive jointly to voltage varying means of each of said servo mechanisms.

RICHARD CARL DEHMEL.

REFERENCES CITED

The following references are of record in the file of this patent:

UNITED STATES PATENTS

| Number | Name | Date |
| --- | --- | --- |
| 1,393,456 | Ruggles | Oct. 11, 1921 |
| 1,393,572 | Ritchie | Oct. 11, 1921 |
| 1,655,244 | Rowell | Jan. 3, 1928 |
| 1,745,933 | Kauch | Feb. 4, 1930 |
| 1,820,619 | Hubl | Aug. 25, 1931 |
| 1,865,828 | Buckley | July 5, 1932 |
| 1,937,241 | Pardue | Nov. 28, 1933 |
| 1,960,350 | Shackleton | May 29, 1934 |
| 1,985,265 | Smith | Dec. 25, 1934 |
| 2,066,949 | Ruiz | Jan. 5, 1937 |
| 2,090,664 | Bruno | Aug. 24, 1937 |
| 2,099,857 | Link | Nov. 23, 1937 |
| 2,110,869 | Crane | Mar. 15, 1938 |
| 2,119,083 | Link | May 31, 1938 |
| 2,124,684 | Behr | July 26, 1938 |
| 2,152,986 | MacLaren | Apr. 11, 1939 |
| 2,164,412 | Koster | July 4, 1939 |
| 2,179,663 | Link | Nov. 14, 1939 |
| 2,190,390 | Thiry | Feb. 13, 1940 |
| 2,226,726 | Kramer | Dec. 31, 1940 |
| 2,243,973 | Mills | June 3, 1941 |
| 2,282,442 | Whitlock | May 12, 1942 |
| 2,351,977 | Kronenberger | June 20, 1944 |
| 2,366,603 | Dehmel | Jan. 2, 1945 |
| 2,397,477 | Kellogg | Apr. 2, 1946 |
| 2,423,336 | Moseley | July 1, 1947 |
| 2,438,126 | Muller | Mar. 23, 1948 |
| 2,444,477 | Stout | July 6, 1948 |
| 2,448,555 | Sorensen | Sept. 7, 1948 |

FOREIGN PATENTS

| Number | Country | Date |
| --- | --- | --- |
| 378,172 | Great Britain | 1932 |
| 396,538 | Great Britain | 1933 |
| 396,540 | Great Britain | 1933 |
| 852,687 | France | 1939 |

OTHER REFERENCES

Air Corps News Letter, vol. 21, No. 6, March 15, 1938.

Aeronautics Bulletin #27, July 1, 1937, published by the Bureau of Air Commerce of the U. S. Dept. of Commerce.